United States Patent
Fujishiro et al.

(10) Patent No.: US 10,321,465 B2
(45) Date of Patent: Jun. 11, 2019

(54) MOBILE COMMUNICATION SYSTEM AND MOBILE COMMUNICATION METHOD

(71) Applicant: KYOCERA CORPORATION, Kyoto (JP)

(72) Inventors: Masato Fujishiro, Yokohama (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/918,939

(22) Filed: Mar. 12, 2018

(65) Prior Publication Data

US 2018/0206222 A1 Jul. 19, 2018

Related U.S. Application Data

(63) Continuation of application No. 14/417,405, filed as application No. PCT/JP2013/069904 on Jul. 23, 2013, now Pat. No. 9,918,318.

(Continued)

(51) Int. Cl.
*H04W 8/00* (2009.01)
*H04W 72/04* (2009.01)
(Continued)

(52) U.S. Cl.
CPC ......... *H04W 72/048* (2013.01); *H04W 8/005* (2013.01); *H04W 48/16* (2013.01); *H04W 76/14* (2018.02)

(58) Field of Classification Search
None
See application file for complete search history.

(56) References Cited

U.S. PATENT DOCUMENTS

2005/0201308 A1   9/2005   Sekiya et al.
2009/0016363 A1   1/2009   Laroia et al.
(Continued)

FOREIGN PATENT DOCUMENTS

JP   H08-205253 A   8/1996
JP   2005-244698 A   9/2005
(Continued)

OTHER PUBLICATIONS

JP Office Action dated Dec. 5, 2017, from corresponding JP Appl No. 2016-174438, with English statement of relevance, 5 pp.
(Continued)

*Primary Examiner* — Brian S Roberts
(74) *Attorney, Agent, or Firm* — Studebaker & Brackett PC

(57) ABSTRACT

A radio terminal includes a receiver, a controller, and a transmitter. The receiver receives first information on radio resources for direct communication from a base station by broadcast and second information on a threshold value from the base station. The controller performs the direct communication by use of a radio resource autonomously selected among the radio resources. The receiver directly receives a radio signal from another radio terminal during performing the direct communication by use of the radio resources, and the controller compares received power of the radio signal with the threshold value of the second information. The transmitter notifies the base station of first information on the received power in response to the received power being larger than the threshold value, and does not notify the base station of the information on the received power in response to the received power being smaller than the threshold value.

3 Claims, 18 Drawing Sheets

Related U.S. Application Data

(60) Provisional application No. 61/676,802, filed on Jul. 27, 2012, provisional application No. 61/676,793, filed on Jul. 27, 2012.

(51) Int. Cl.
*H04W 76/14* (2018.01)
*H04W 48/16* (2009.01)

(56) References Cited

U.S. PATENT DOCUMENTS

| | | | |
|---|---|---|---|
| 2009/0325625 A1* | 12/2009 | Hugl | H04W 52/16 455/522 |
| 2010/0093364 A1* | 4/2010 | Ribeiro | H04W 72/082 455/452.2 |
| 2010/0165882 A1* | 7/2010 | Palanki | H04W 76/14 370/254 |
| 2011/0182271 A1 | 7/2011 | Pica et al. | |
| 2012/0044815 A1 | 2/2012 | Geirhofer et al. | |
| 2012/0115518 A1 | 5/2012 | Zeira et al. | |
| 2012/0320790 A1 | 12/2012 | Shaffer et al. | |
| 2013/0021927 A1 | 1/2013 | Yokoo | |
| 2014/0029471 A1 | 1/2014 | Tavildar et al. | |
| 2015/0111383 A1 | 4/2015 | Miura et al. | |

FOREIGN PATENT DOCUMENTS

| | | |
|---|---|---|
| JP | 2010-035068 A | 2/2010 |
| JP | 2013-26926 A | 2/2013 |
| WO | 2011/130623 A2 | 10/2011 |
| WO | 2012/166969 A1 | 12/2012 |

OTHER PUBLICATIONS

Extended European Search Report issued by the European Patent Office dated Feb. 16, 2017, which corresponds to European Patent Application No. 16196196.6-1854 and is related to U.S. Appl. No. 14/417,405; 9 pp.

An Office Action; "Decision of Rejection," issued by the Japanese Patent Office dated Jun. 7, 2016, which corresponds to Japanese Patent Application No. 2014-526936 and is related to U.S. Appl. No. 14/417,405; with English language statement of relevance.

Communication pursuant to Rule 164(1) EPC issued by the European Patent Office dated Feb. 16, 2016, which corresponds to European Patent Application No. 13823395.2-1854 and is related to U.S. Appl. No. 14/417,405.

Klaus Doppler et al., Device-to-Device Communication as an Underlay to LTE-Advanced Networks, IEEE Communications Magazine, Dec. 2009, pp. 42-49.

International Search Report; PCT/JP2013/069904; dated Oct. 1, 2013.

3GPP TR 22.803 V0.3.0 (May 2012); 3rd Generation Partnership Project; Technical Specification Group SA; Feasibility Study for Proximity Services (ProSe)(Release 12).

\* cited by examiner

FIG. 5
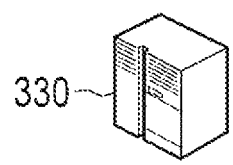
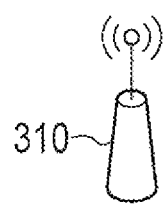
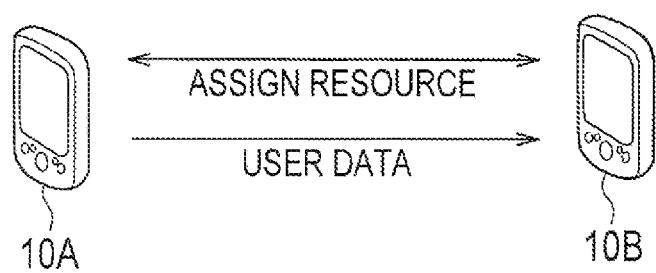

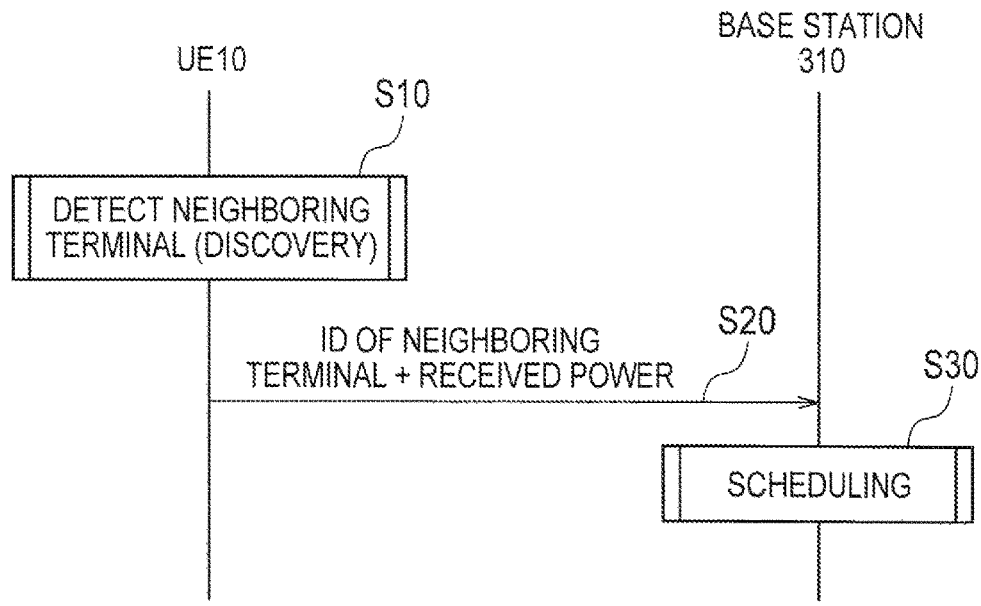
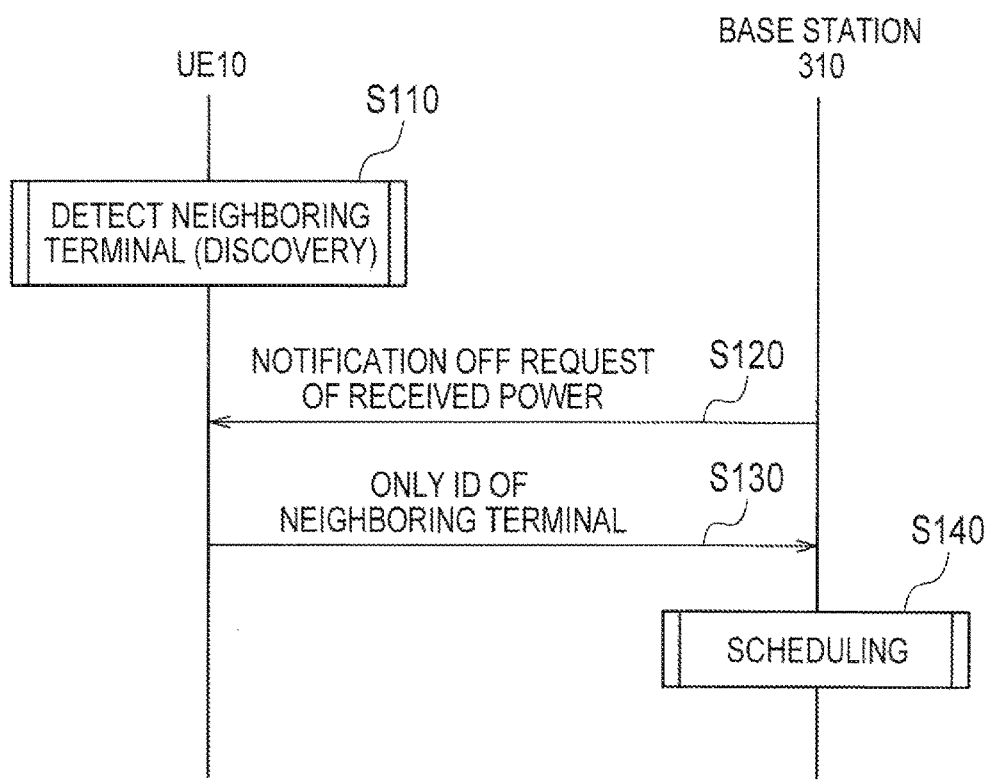

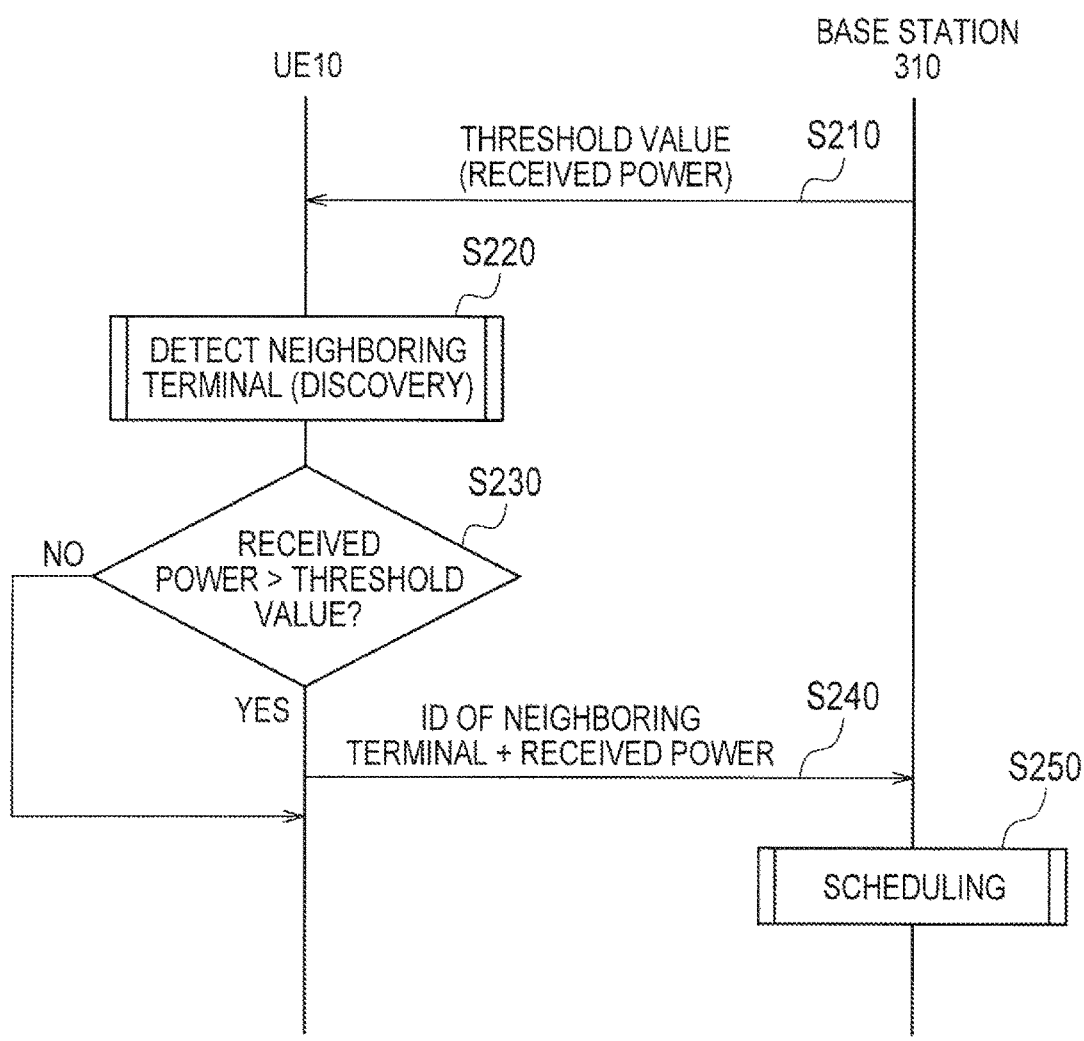

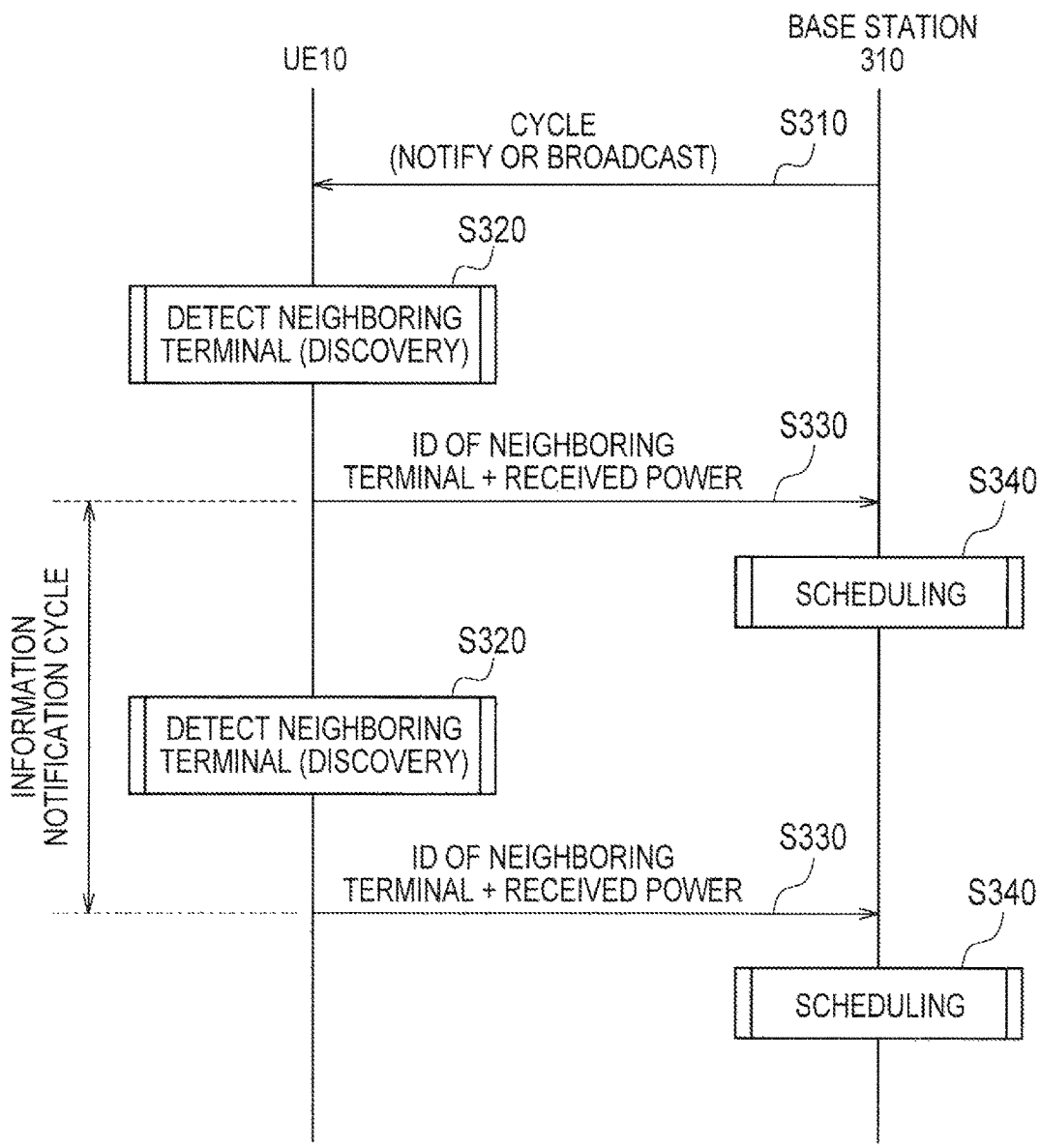

FIG. 19
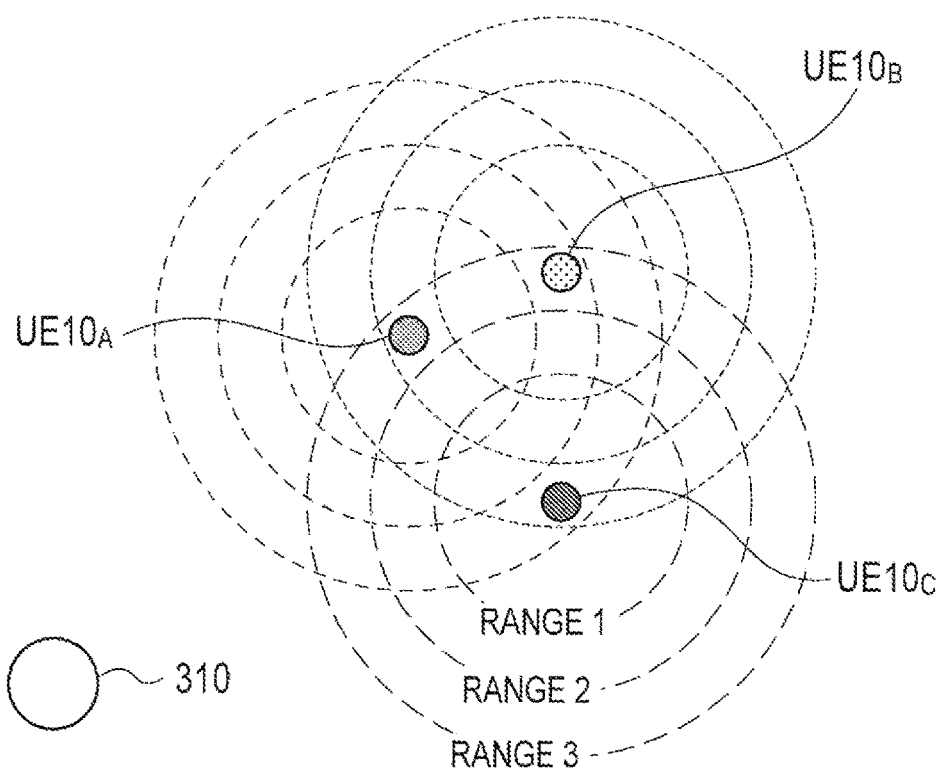
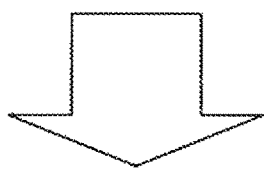
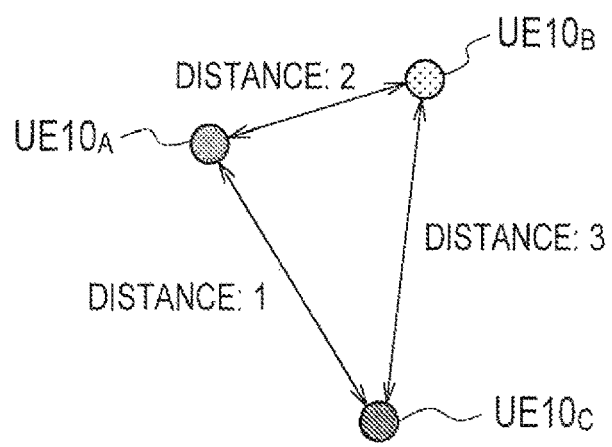

MOBILE COMMUNICATION SYSTEM AND MOBILE COMMUNICATION METHOD

CROSS-REFERENCE TO RELATED APPLICATIONS

This application is a Continuation Application of U.S. patent application Ser. No. 14/417,405 filed Jan. 26, 2015, which is the U.S. National Stage Application of International Patent Application No. PCT/JP2013/069904 filed Jul. 23, 2013, which claims benefit of U.S. Provisional Application Nos. 61/676,793 filed Jul. 27, 2012 and 61/676,802 filed Jul. 27, 2012, the entire contents of which are incorporated herein by reference.

TECHNICAL FIELD

The present disclosure relates to a mobile communication system in which user data is communicated directly among a plurality of radio terminals and a mobile communication method used in the mobile communication system.

BACKGROUND ART

In recent years, there has been proposed a technique of directly communicating user data (data of User-Plane) among a plurality of radio terminals without passing through a radio base station (D2D communication). The communication of user data directly performed among the plurality of radio terminals is performed by using a part of radio resources assigned to a mobile communication system. However, in the D2D communication, the communication of control data (C-Plane) is performed via the radio base station, similarly to a conventional mobile communication system.

PRIOR ART DOCUMENT

Non-Patent Document

Non-Patent Document 1: 3GPP technical report "TR 22. 803 V0.3.0" May 2012

SUMMARY

Furthermore, in order to realize the D2D communication, a radio terminal needs to discover another radio terminal. The inventors of the present disclosure found that such a process could also be applied not only to the D2D communication but also to another process.

A radio terminal according to the present disclosure comprises a receiver, a controller, and a transmitter. The receiver is configured to receive first information on radio resources for direct communication from a base station by broadcast and receive second information on a threshold value from the base station. The controller is configured to perform the direct communication by use of a radio resource autonomously selected among the radio resources. The receiver is configured to directly receive a radio signal from another radio terminal during performing the direct communication by use of the radio resources, and the controller is configured to compare received power of the radio signal with the threshold value of the second information. The transmitter is configured to notify the base station of first information on the received power in response to the received power being larger than the threshold value, and not notify the base station of the information on the received power in response to the received power being smaller than the threshold value.

A processor of a radio terminal according to the present disclosure is communicatively coupled to a memory and configured to receive first information on radio resources for direct communication, from a base station by broadcast, receive second information on a threshold value from the base station, perform the direct communication by use of a radio resource autonomously selected among the radio resources, directly receive a radio signal from another radio terminal during performing the direct communication by use of the radio resources. The processor is configured to compare received power of the radio signal with the threshold value of the second information, notify the base station of information on the received power in response to the received power larger than the threshold value, and not notify the base station of information on the received power in response to the received power being smaller than the threshold value.

A mobile communication method according to the present disclosure comprises transmitting, by a base station, first information on radio resources for direct communication by broadcast, receiving, by a radio terminal, the first information from the base station, transmitting, by the base station, second information on a threshold value from the base station, and receiving, by the radio terminal, the second information from the base station. The method comrises performing, by the radio terminal, the direct communication by use of a radio resource autonomously selected among the radio resources, and directly receiving, by the radio terminal, a radio signal from another radio terminal during performing the direct communication by use of the radio resources. The method comprises comparing, by the radio terminal, received power of the radio signal with a threshold value of the second information, notifying, by the radio terminal, the base station of information on the received power in response to the received power being larger than the threshold value, and not notifying, by the radio terminal, the base station of the information on the received power in response to the received power being smaller than the threshold value.

BRIEF DESCRIPTION OF THE DRAWINGS

FIG. 5 is a diagram illustrating a first assignment mode according to the first embodiment.

FIG. 12 is a sequence diagram illustrating the operation of the mobile communication system 100 according to the first embodiment.

FIG. 13 is a sequence diagram illustrating the operation of the mobile communication system 100 according to a first modification.

FIG. 14 is a sequence diagram illustrating the operation of the mobile communication system 100 according to a second modification.

FIG. 15 is a sequence diagram illustrating the operation of the mobile communication system 100 according to a third modification.

FIG. 19 is a diagram for explaining a method of specifying distribution of UEs 10 according to a seventh modification.

DESCRIPTION OF THE EMBODIMENT

Figure 1:
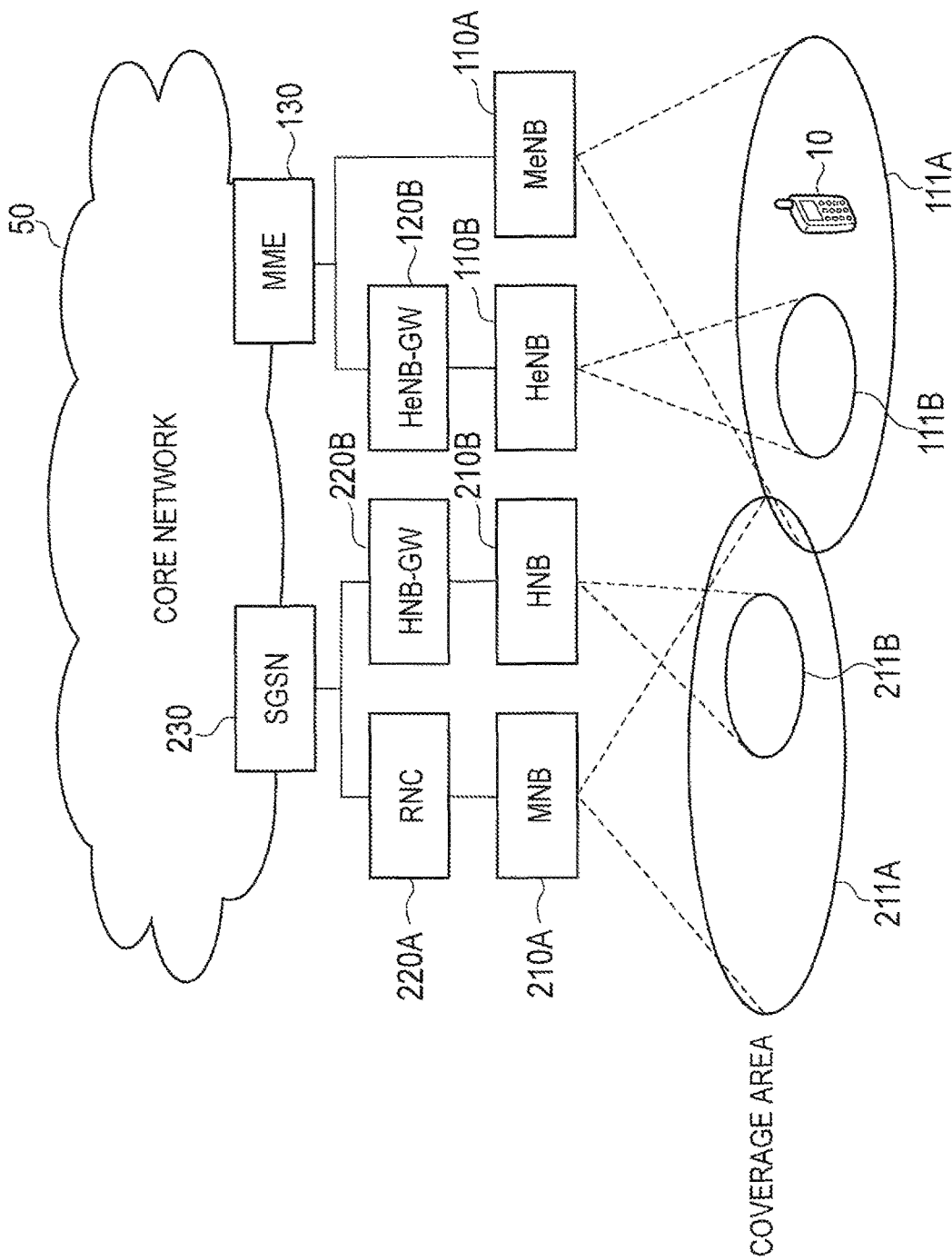
FIG. 1 is a diagram illustrating a mobile communication system 100 according to a first embodiment.

Hereinafter, a mobile communication system according to an embodiment of the present disclosure will be described with reference to the accompanying drawings. Note that in the descriptions of the drawing below, identical or similar symbols are assigned to identical or similar portions.

It will be appreciated that the drawings are schematically shown and the ratio and the like of each dimension are different from the real ones. Accordingly, specific dimensions should be determined in consideration of the explanation below. Of course, among the drawings, the dimensional relationship and the ratio may be different.

Overview of Embodiment

In a mobile communication system according to the embodiment, user data is communicated directly among a plurality of radio terminals without passing through a radio base station. The communication of user data directly performed among the plurality of radio terminals is performed by using a part of radio resources assigned to the mobile communication system. A D2D terminal included in the plurality of radio terminal notifies the radio base station of an identifier of a neighboring terminal located in the neighborhood of the D2D terminal, or the neighboring terminal notifies the radio base station of an identifier of the D2D terminal.

In the embodiment, the D2D terminal notifies the radio base station of an identifier of a neighboring terminal, or the neighboring terminal notifies the radio base station of an identifier of the D2D terminal. Thus, the radio base station can specify a relative positional relationship between the D2D terminal and the neighboring terminal. Further, the radio base station can specify a distribution of radio terminals present in a cell managed by the radio base station with a certain degree of accuracy. Such a distribution is useful when used in radio resource scheduling, SON (Self Organizing Network), or MDT (Minimization of Drive Tests).

Furthermore, the communication performed directly among the plurality of radio terminals without passing through the radio base station may be called D2D communication. The D2D communication is performed by using a part (a D2D radio resource) of the radio resources assigned to the mobile communication system. As the D2D radio resource, for example, a part of uplink radio resources is used.

Furthermore, a radio resource used in the communication of the user data in the D2D communication may be assigned by a radio base station or may be assigned by a radio terminal (a transmission-side terminal or a reception-side terminal).

Furthermore, in the first embodiment, the D2D terminal notifies the radio base station of a received power of a signal transmitted from the neighboring terminal, together with the identifier of the neighboring terminal, or the neighboring terminal notifies the radio base station of the received power of the signal transmitted from the D2D terminal, together with the identifier of the D2D terminal.

Furthermore, in the first modification, the D2D terminal notifies the radio base station of the identifier of the neighboring terminal in response to an instruction received from the radio base station, or the neighboring terminal notifies the radio base station of an identifier of the D2D terminal in response to an instruction received from the radio base station.

Furthermore, in the second modification, the D2D terminal notifies the radio base station of the received power of the signal transmitted from the neighboring terminal in response to a result of comparison between the received power of the signal transmitted from the neighboring terminal and a threshold value, or the neighboring terminal notifies the radio base station of the received power of the signal transmitted from the D2D terminal in response to a result of comparison between the received power of the signal transmitted from the D2D terminal and a threshold value.

Furthermore, in the second modification, the D2D terminal is notified, from the radio base station, of the threshold value compared with the received power of the signal transmitted from the neighboring terminal, or the neighboring terminal is notified, from the radio base station, of the threshold value compared with the received power of the signal transmitted from the D2D terminal.

Furthermore, in the third modification, the D2D terminal is notified, from the radio base station, of a cycle in which the identifier of the neighboring terminal is notified to the radio base station, or the neighboring terminal is notified, from the radio base station, of a cycle in which the identifier of the D2D terminal is notified to the radio base station.

Furthermore, in the first embodiment, the radio base station or a node higher than the radio base station specifies a distribution of radio terminals present in a cell managed by the radio base station on the basis of the identifier of the neighboring terminal notified from the D2D terminal or the identifier of the D2D terminal notified from the neighboring terminal.

Furthermore, in the seventh modification, the radio base station or a node higher than the radio base station specifies the distribution of radio terminals present in the cell managed by the radio base station on the basis of the identifier of the neighboring terminal notified from the D2D terminal and a received power of a signal transmitted from the neighboring terminal or the identifier of the D2D terminal notified from the neighboring terminal and a received power of a signal transmitted from the D2D terminal.

Furthermore, in the sixth and eighth modification, the radio base station or a node higher than the radio base station specifies the distribution of radio terminals present in the cell managed by the radio base station on the basis of the identifier of the neighboring terminal notified from the D2D terminal and Timing Advance of the D2D terminal or the identifier of the D2D terminal notified from the neighboring terminal and Timing Advance of the neighboring terminal.

Furthermore, in a mobile communication system according to the embodiment, user data is communicated directly among a plurality of radio terminals without passing through a radio base station. The communication of user data directly performed among the plurality of radio terminals is performed by using a part of radio resources assigned to the mobile communication system. The radio base station is notified of an identifier of a neighboring terminal located in the neighborhood of a D2D terminal from the D2D terminal included in the plurality of radio terminals or an identifier of the D2D terminal from the neighboring terminal. The radio base station controls a D2D terminal radio resource to be assigned to the D2D terminal or a neighboring terminal radio resource to be assigned to the neighboring terminal on the basis of the identifier of the neighboring terminal or the identifier of the D2D terminal.

In the embodiment, the radio base station controls a D2D terminal radio resource to be assigned to the D2D terminal or a neighboring terminal radio resource to be assigned to the neighboring terminal on the basis of the identifier of the neighboring terminal or the identifier of the D2D terminal. Thus, it is possible to suppress interference to the communication performed by the neighboring terminal due to the communication that the D2D terminal performs directly without passing through the radio base station or the interference to the communication that the D2D terminal performs directly without passing through the radio base station due to the communication performed by the neighboring terminal.

Furthermore, in the first embodiment, the radio base station is notified of a D2D terminal received power of a signal transmitted from the neighboring terminal, together with the identifier of the neighboring terminal from the D2D terminal, or a neighboring terminal received power of a signal transmitted from the D2D terminal, together with the identifier of the D2D terminal from the neighboring terminal, and the radio base station controls the D2D terminal radio resource or the neighboring terminal radio resource on the basis of the identifier of the neighboring terminal and the D2D terminal received power or the identifier of the D2D terminal and the neighboring terminal received power.

Furthermore, in the first embodiment, the radio base station controls the D2D terminal radio resource or the neighboring terminal radio resource so that the D2D terminal radio resource and the neighboring terminal radio resource do not overlap when it is determined that a distance between the D2D terminal and the neighboring terminal is smaller than a threshold value.

Furthermore, in the first embodiment, the radio base station controls the D2D terminal radio resource or the neighboring terminal radio resource so that the D2D terminal radio resource and the neighboring terminal radio resource overlap when it is determined that a distance between the D2D terminal and the neighboring terminal is larger than a threshold value.

Furthermore, in the first embodiment, the neighboring terminal communicates the user data via the radio base station, and the radio base station controls the D2D terminal radio resource or the neighboring terminal radio resource so that the D2D terminal radio resource and the neighboring terminal radio resource do not overlap when it is determined that a distance between the radio base station and the neighboring terminal is larger than a distance between the radio base station and the D2D terminal.

Furthermore, in the first embodiment, the neighboring terminal communicates the user data via the radio base station, and the radio base station controls the D2D terminal radio resource or the neighboring terminal radio resource so that the D2D terminal radio resource and the neighboring terminal radio resource overlap when it is determined that a distance between the radio base station and the neighboring terminal is smaller than a distance between the radio base station and the D2D terminal.

Furthermore, in the fifth modification, the radio base station notifies another radio base station different from the radio base station of the identifier of the neighboring terminal or the identifier of the D2D terminal.

Furthermore, in the fifth modification, the radio base station notifies the other radio base station of the D2D terminal received power, together with the identifier of the neighboring terminal, or the neighboring terminal received power, together with the identifier of the D2D terminal.

Furthermore, a mobile communication method according to the embodiment is a mobile communication method used in a mobile communication system, in which communication of user data is directly performed among a plurality of radio terminals without passing through a radio base station. The communication of user data directly performed among the plurality of radio terminals is performed by using a part of radio resources assigned to the mobile communication system. The mobile communication method comprises: a step of notifying the radio base station, of an identifier of a neighboring terminal located in the neighborhood of the D2D terminal, from a D2D terminal included in the plurality of radio terminals, or a step of notifying the radio base station of an identifier of the D2D terminal, from the neighboring terminal.

The mobile communication method according to the embodiment comprises: a step of controlling, at the radio base station, a D2D terminal radio resource to be assigned to the D2D terminal or a neighboring terminal radio resource to be assigned to the neighboring terminal on the basis of the identifier of the neighboring terminal or the identifier of the D2D terminal.

First Embodiment (Mobile Communication System)

Hereinafter, a mobile communication system according to a first embodiment will be described. FIG. 1 is a diagram illustrating a mobile communication system 100 according to the first embodiment.

As illustrated in FIG. 1, the mobile communication system 100 includes a radio terminal 10 (hereinafter, referred to as UE 10) and a core network 50. Furthermore, the mobile communication system 100 includes a first communication system and a second communication system.

The first communication system is a communication system corresponding to LTE (Long Term Evolution), for example. The first communication system has a base station 110A (hereinafter, referred to as MeNB 110A), a home base station 110B (hereinafter, referred to as HeNB 110B), a home base station gateway 120B (hereinafter, referred to as HeNB-GW 120B), and MME 130, for example.

In addition, a radio access network (E-UTRAN; Evolved Universal Terrestrial Radio Access Network) corresponding to the first communication system is configured by the MeNB 110A, the HeNB 110B, and the HeNB-GW 120B.

The second communication system is a communication system corresponding to UMTS (Universal Mobile Telecommunication System), for example. The second communication system includes a base station 210A (hereinafter, referred to as MNB 210A), a home base station 210B (hereinafter, referred to as HNB 210B), RNC 220A, a home base station gateway 220B (hereinafter, referred to as HNB-GW 220B), and SGSN 230.

In addition, a radio access network (UTRAN; Universal Terrestrial Radio Access Network) corresponding to the second communication system is configured by the MNB 210A, the HNB 210B, the RNC 220A, and the HNB-GW 220B.

The UE 10 is a device (User Equipment) that communicates with the second communication system or the first communication system. For example, the UE 10 has a function of performing radio communication with the MeNB 110A and the HeNB 110B. Alternatively, the UE 10 has a function of performing radio communication with the MNB 210A and the HNB 210B.

The MeNB 110A, which manages a general cell 111A, is a device (evolved NodeB) that performs radio communication with the UE 10 being present in the general cell 111A.

The HeNB 110B, which manages a specific cell 111B, is a device (Home evolved NodeB) that performs radio communication with the UE 10 being present in the specific cell 111B.

The HeNB-GW 120B, which is connected to the HeNB 110B, is a device (Home evolved NodeB Gateway) that manages the HeNB 110B.

The MME 130, which is connected to the MeNB 110A, is a device (Mobility Management Entity) that manages the mobility of the UE 10 having set up a radio connection with the MeNB 110A. Furthermore, the MME 130, which is connected to the HeNB 110B via the HeNB-GW 120B, is a device that manages the mobility of the UE 10 having set up a radio connection with the HeNB 110B.

The MNB 210A, which manages a general cell 211A, is a device (NodeB) that performs radio communication with the UE 10 being present in the general cell 211A.

The HNB 210B, which manages a specific cell 211B, is a device (Home NodeB) that performs radio communication with the UE 10 being present in the specific cell 211B.

The RNC 220A, which is connected to the MNB 210A, is a device (Radio Network Controller) that sets up a radio connection (RRC Connection) with the UE 10 being present in the general cell 211A.

The HNB-GW 220B, which is connected to the HNB 210B, is a device (Home NodeB Gateway) that sets up a radio connection (RRC Connection) with the UE 10 being present in the specific cell 211B.

The SGSN 230 is a device (Serving GPRS Support Node) that performs packet switching in a packet switching domain. The SGSN 230 is provided in the core network 50. Although not illustrated in FIG. 1, a device (MSC; Mobile Switching Center) that performs circuit switching in a circuit switching domain may be provided in the core network 50.

In addition, it is noted that the general cell and the specific cell are understood as a function of performing radio communication with the UE 10. However, the general cell and the specific cell are also used as a term indicating a coverage area of a cell. Furthermore, cells such as general cells and specific cells are identified by frequencies, spreading codes, time slots and the like used in the cells.

Here, a coverage area of the general cell is wider than a coverage area of the specific cell. The general cell, for example, is a macro cell provided by a communication provider. The specific cell, for example, is a femto cell or a home cell provided by the third party other than the communication provider. The specific cell may be a CSG (Closed Subscriber Group) cell or a pico cell provided by the communication provider.

Hereinafter, the first communication system will be mainly described. The following description may also be applied to the second communication system.

In the first communication system, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme.

Furthermore, in the first communication system, as an uplink channel, an uplink control channel (PUCCH; Physical Uplink Control Channel), an uplink shared channel (PUSCH; Physical Uplink Shared Channel) and the like exist. Furthermore, as a downlink channel, a downlink control channel (PDCCH; Physical Downlink Control Channel), a downlink shared channel (PDSCH; Physical Downlink Shared Channel) and the like exist.

The uplink control channel is a channel that carries a control signal. The control signal, for example, includes CQI (Channel Quality Indicator), PMI (Precoding Matrix Indicator), RI (Rank Indicator), SR (Scheduling Request), and ACK/NACK.

The CQI is a signal for notifying of a recommended modulation scheme and a coding rate to be used in the downlink transmission. The PMI is a signal that indicates a precoding matrix that is desirably used for the downlink transmission. The RI is a signal that indicates the number of layers (the number of streams) to be used in the downlink transmission. The SR is a signal that requests the assignment of an uplink radio resource (a resource block which will be described later). The ACK/NACK is a signal that indicates whether a signal transmitted through a downlink channel (for example, PDSCH) has been received.

The uplink shared channel is a channel that carries a control signal (including the aforementioned control signal) and/or a data signal. For example, the uplink radio resource maybe assigned only to the data signal, or may be assigned such that the data signal and the control signal are multiplexed.

The downlink control channel is a channel that carries a control signal. The control signal, for example, is Uplink Scheduling Grants, Downlink Scheduling Assignments, and TPC bit.

The Uplink SI is a signal that indicates the assignment of the uplink radio resource. The Downlink SI is a signal that indicates the assignment of a downlink radio resource. The TPC bit is a signal that indicates increase and decrease in power of a signal that is transmitted through the uplink channel.

The downlink shared channel is a channel that carries a control signal and/or a data signal. For example, the downlink radio resource may be assigned only to the data signal, or may be assigned such that the data signal and the control signal are multiplexed.

In addition, a control signal transmitted through the downlink shared channel includes TA (Timing Advance). The TA is transmission timing correction information between the UE 10 and the MeNB 110A, and is measured by the MeNB 110A on the basis of an uplink signal transmitted from the UE 10.

Furthermore, a control signal that is transmitted through a channel other than the downlink control channel (PDCCH) and the downlink shared channel (PDSCH) includes the ACK/NACK. The ACK/NACK is a signal that indicates whether a signal transmitted through an uplink channel (for example, PUSCH) has been received.

In addition, the general cell and the specific cell broadcast information through a broadcast channel (BCCH; Broadcast Control Channel). The broadcast information, for example, is information such as MIB (Master Information Block) and SIB (System Information Block).

Specifically not illustrated in FIG. 1, the first communication system may include a relay node that relays data communication between the MeNB 110A (or the HeNB 110B) and the UE 10. Similarly, the second communication system may include a relay node that relays data communication with the MNB 210A (or the HNB 210B).

(Radio Frame)

Figure 2:
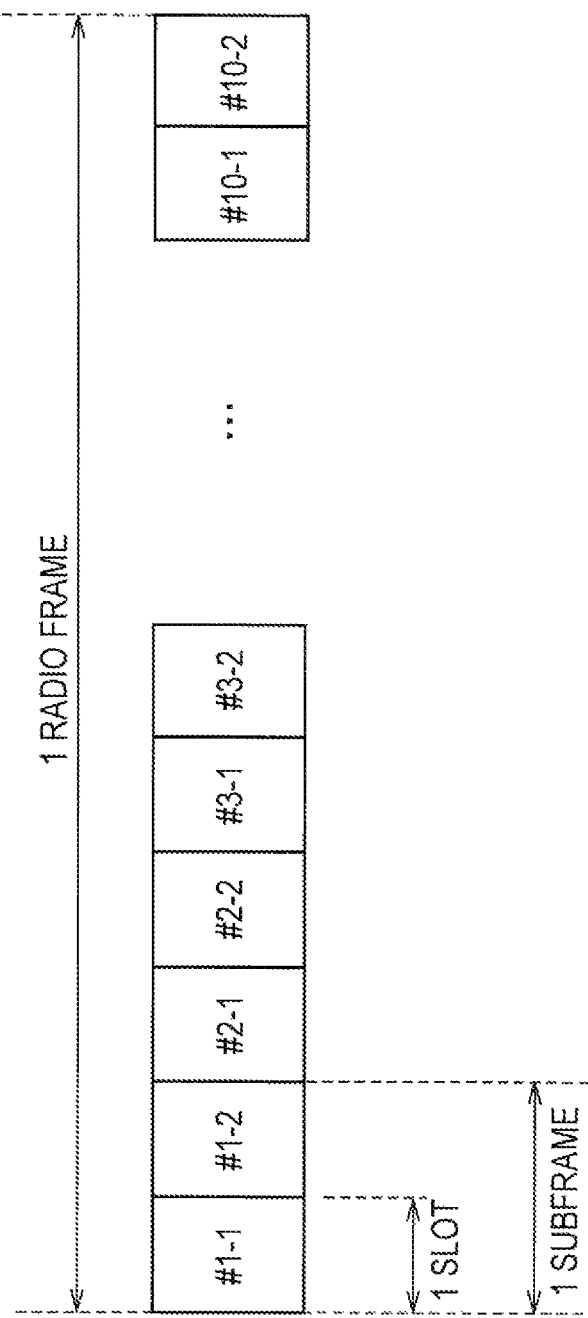
FIG. 2 is a diagram illustrating a radio frame according to the first embodiment.

Hereinafter, a radio frame in the first communication system will be described. FIG. 2 is a diagram illustrating the radio frame in the first communication system.

As illustrated in FIG. 2, one radio frame is configured by 10 subframes and one subframe is configured by two slots. One slot has a time length of 0.5 msec, one subframe has a time length of 1 msec, and one radio frame has a time length of 10 msec.

In addition, one slot is configured by a plurality of OFDM symbols (for example, six OFDM symbols or seven OFDM symbols) in a downlink. Similarly, one slot is configured by a plurality of SC-FDMA symbols (for example, six SC-FDMA symbols or seven SC-FDMA symbols) in an uplink.

(Radio Resource)

Figure 3:
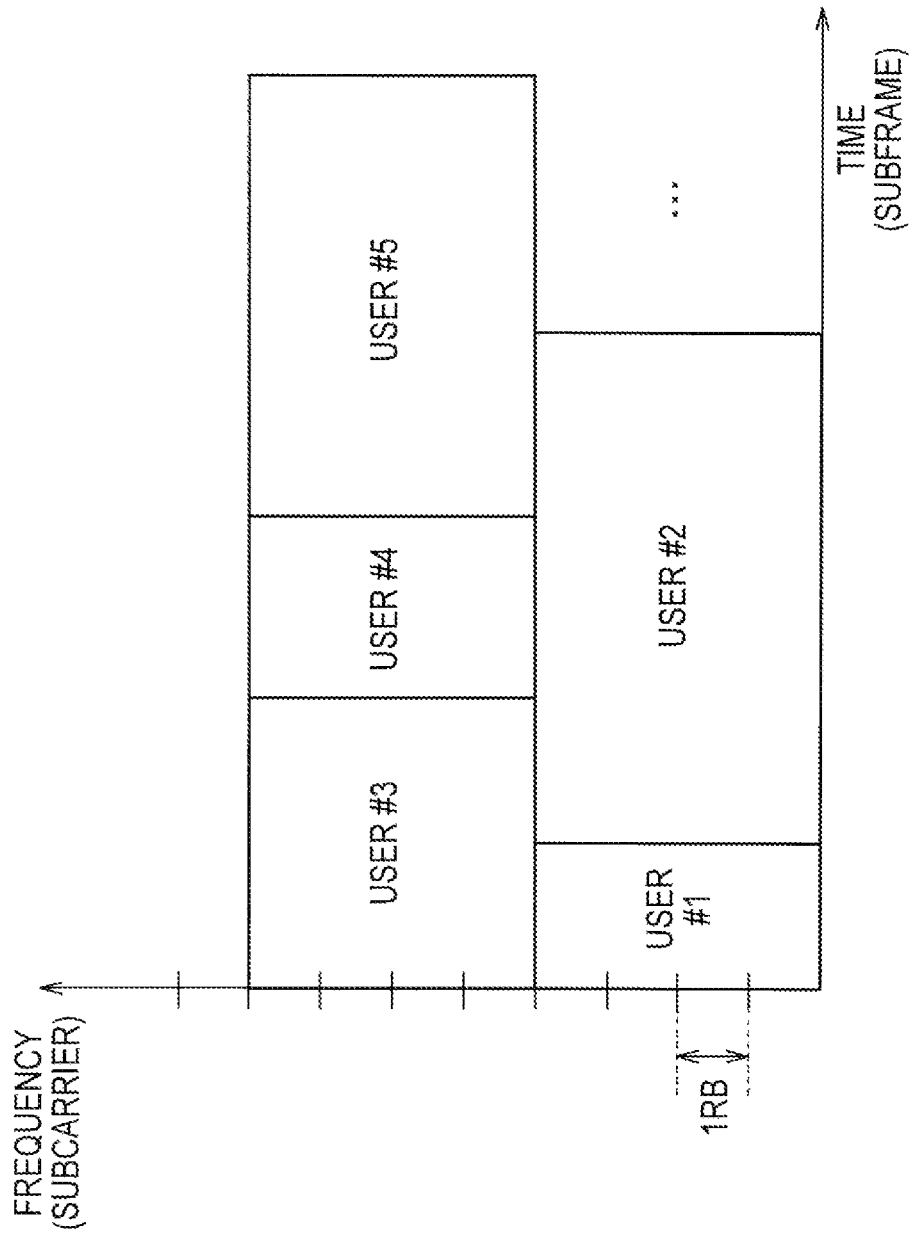
FIG. 3 is a diagram illustrating a radio resource according to the first embodiment.

Hereinafter, a radio resource in the first communication system will be described. FIG. 3 is a diagram illustrating the radio resource in the first communication system.

As illustrated in FIG. 3, a radio resource is defined by a frequency axis and a time axis. A frequency is configured by a plurality of subcarriers, and a predetermined number of subcarriers (12 subcarriers) are collectively called a resource block (RB). A time has a unit, such as the OFDM symbol (or the SC-FDMA symbol), the slot, the subframe, and the radio frame, as described above.

Here, the radio resource is assignable to each one resource block. Furthermore, on the frequency axis and the time axis, it is possible to divide and assign the radio resources to a plurality of users (for example, a user #1 to a user #5).

Furthermore, the radio resource is assigned by the MeNB 110A. The MeNB 110A assigns the radio resources to each UE 10 on the basis of the CQI, the PMI, the RI and the like.

(Application Case)

Figure 4:
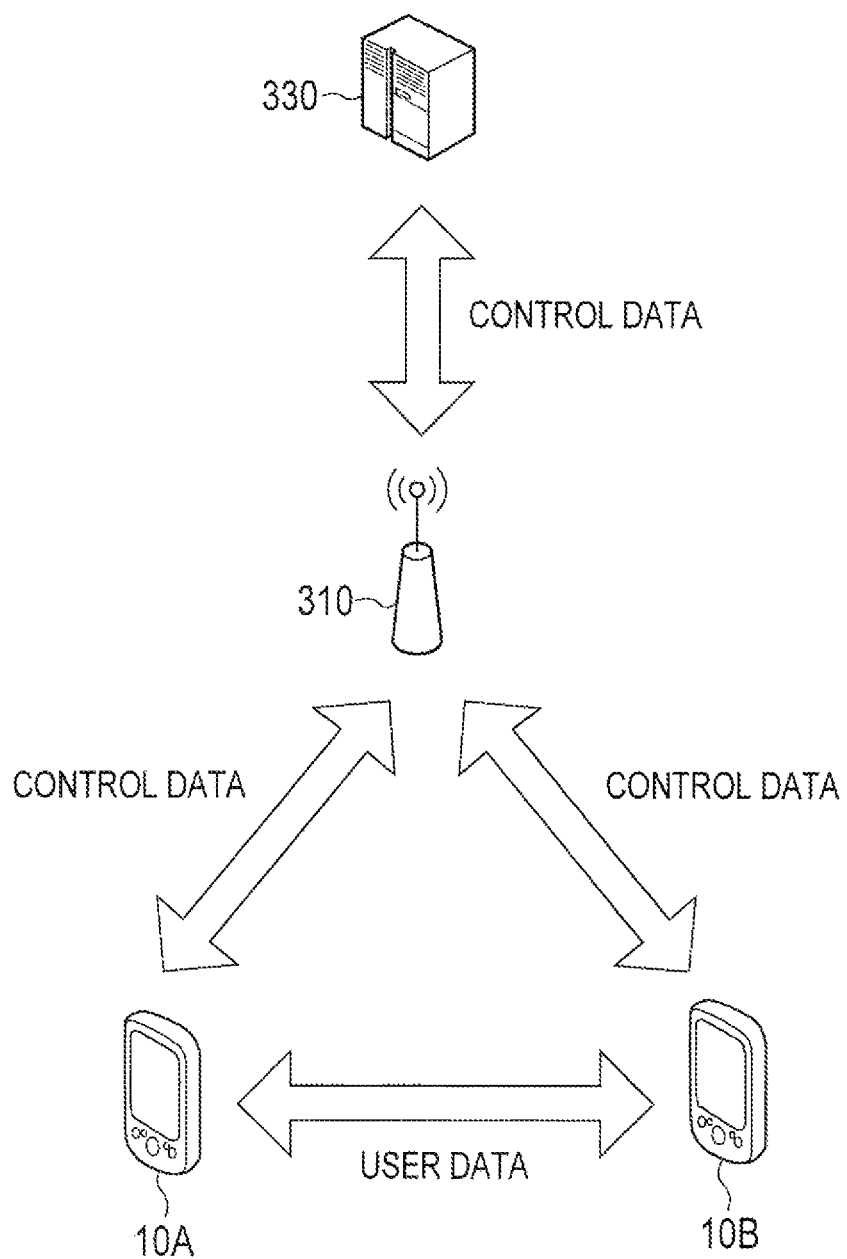
FIG. 4 is a diagram illustrating a case where the first embodiment is applied.

Hereinafter, the application case according to the first embodiment will be described. FIG. 4 is a diagram for explaining the application case according to the first embodiment. In FIG. 4, UE 10A and UE 10B are illustrated as the UE 10. A radio base station 310 is preferably the MeNB 110A or the HeNB 110B. However, the radio base station 310 may be the MNB 210A or the HNB 210B. Alternatively, the radio base station 310 may be a relay node. A network device 330 is a device provided in the core network 50. The network device 330 may be the MME 130 or the SGSN 230.

As illustrated in FIG. 4, the communication of the user data (data of User-Plane) is directly performed among a plurality of UEs 10 without passing through the radio base station (hereinafter, referred to as D2D communication). On the other hand, the communication of the control data (data of C-Plane) is performed via the radio base station 310, similarly to a conventional mobile communication system.

Furthermore, the D2D communication is performed by using a part (hereinafter, a D2D radio resource) of radio resources assigned to the mobile communication system. As the D2D radio resource, for example, a part of uplink radio resources is used. A radio resource used in the D2D communication of the user data may be assigned by the radio base station 310 or may be assigned by the UE 10 (a transmission-side terminal or a reception-side terminal).

The D2D radio resource is preferably broadcast from respective cells managed by the radio base station 310, for example. The D2D radio resource may be included in MIB (Master Information Block) or SIB (System Information Block), for example.

Furthermore, each UE 10 broadcasts a signal (hereinafter, referred to as Discovery signal) with predetermined power for detecting a neighboring terminal capable of performing D2D communication. On the other hand, the neighboring terminal broadcasts a response signal (hereinafter, referred to as Discovery response) with predetermined power to the Discovery signal. The Discovery signal includes an identifier (an identifier of the UE 10) of a transmission source of the Discovery signal. The Discovery response includes an identifier (an identifier of the neighboring terminal) of the transmission source of the Discovery response.

(First Assignment Mode)

Hereinafter, a first assignment mode according to the first embodiment will be described. FIG. 5 is a diagram for explaining the first assignment mode according to the first embodiment. In FIG. 5, as the UE 10, the UE 10A and UE 10B are illustrated. The UE 10A is an example of a transmission-side terminal and the UE 10B is an example of a reception-side terminal. In the embodiment, a case where a second assignment mode is used will be mainly described, a scene where the first assignment mode is used may be present.

As illustrated in FIG. 5, in the first assignment mode, the UE 10 (the UE 10A or UE 10B) assigns the radio resource used for the communication of the user data in the D2D communication. Specifically, the UE 10 (the UE 10A or UE 10B) autonomously assigns the radio resource used for the communication of the user data in the D2D communication from among D2D radio resources broadcast from each cell managed by the radio base station 310. The UE 10 notifies another UE 10 of the assigned radio resource (resource assignment).

The UE 10 may directly notify another UE10 of the assigned radio resource or may notify the other UE 10 via the radio base station 310 and without passing through the core network.

The UE 10A transmits user data to the UE 10B by using the assigned radio resource. Similarly, the UE 10B receives the user data from the UE 10A by using the assigned radio resource.

(Second Assignment Mode)

Figure 6:
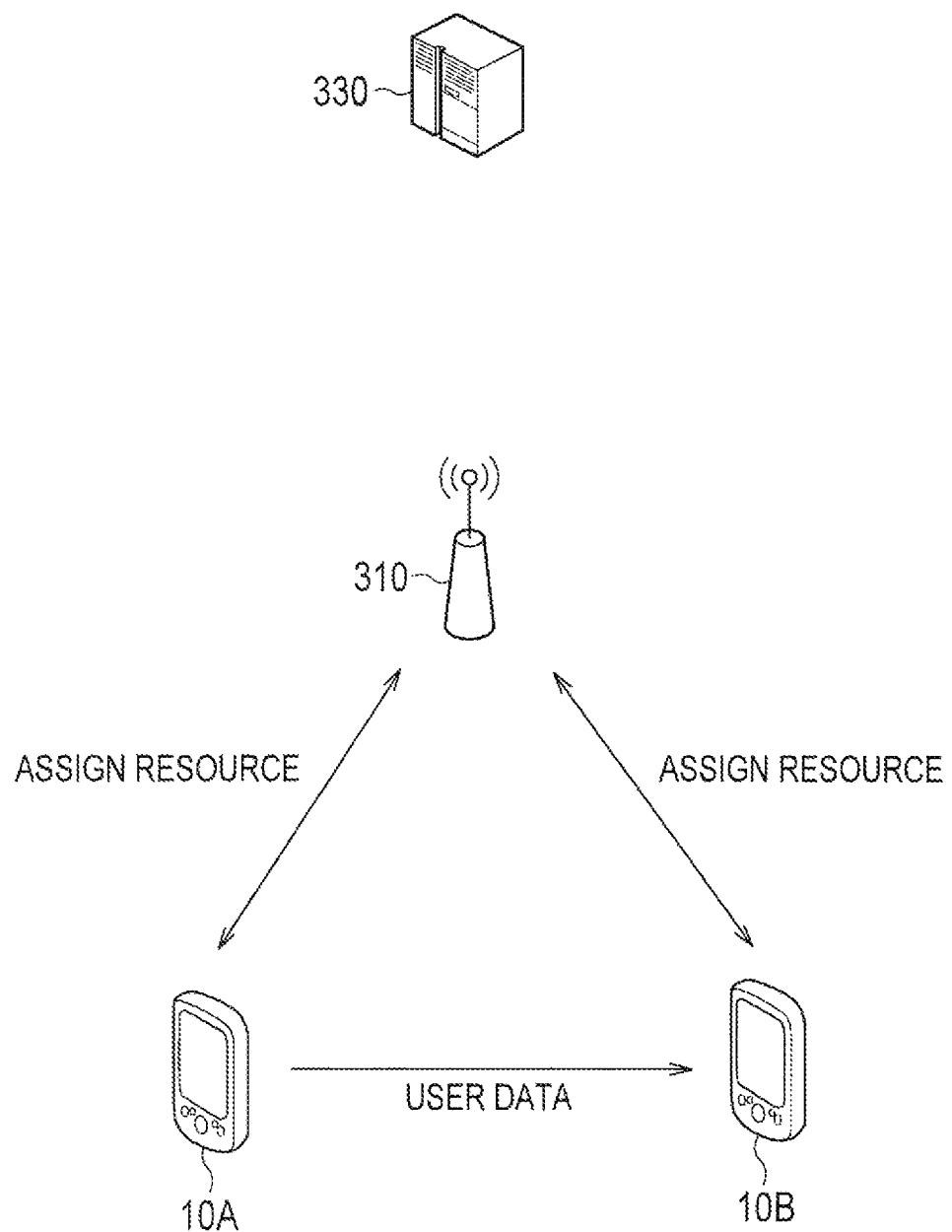
FIG. 6 is a diagram illustrating a second assignment mode according to the first embodiment.

Hereinafter, the second assignment mode according to the first embodiment will be described. FIG. 6 is a diagram for explaining the second assignment mode according to the first embodiment. In FIG. 6, as the UE 10, the UE 10A and UE 10B are illustrated. The UE 10A is an example of a transmission-side terminal and the UE 10B is an example of a reception-side terminal.

As illustrated in FIG. 6, in the second assignment mode, the radio base station 310 assigns the radio resource used for the communication of the user data in the D2D communication. Specifically, the radio base station 310 assigns, to the UE 10A and UE 10B, the radio resource used for the communication of the user data in the D2D communication from among D2D radio resources. The radio base station 310 notifies the UE 10A and UE 10B of the assigned radio resource (resource assignment).

The UE 10A transmits user data to the UE 10B by using the assigned radio resource. Similarly, the UE 10B receives the user data from the UE 10A by using the assigned radio resource.

Specifically, the radio base station 310 notifies the UE 10A and UE 10B of a target received power of the user data used in the D2D communication before starting the D2D communication. The radio base station 310 may broadcast the target received power by using a broadcast channel such as SIB and may transmit the target received power to the UE 10A and UE 10B by using an individual control channel such as PDCCH. The target received power is also called "Nominal Power for D2D".

In the embodiment, the radio base station 310 notifies the UE 10A (the transmission-side terminal) of the assignment information on the radio resource used in the D2D communication. When the D2D communication is performed by using an uplink radio resource, the assignment information of the radio resource is the existing uplink scheduling information used in the cellular communication. The transmission unit 314 transmits the uplink scheduling information to the UE 10A by using the individual control channel such as PDCCH. The uplink scheduling information is also called "Uplink Scheduling Grants". However, it is to be noted that the uplink scheduling information is extended as below.

Here, the uplink scheduling information includes at least one of: information indicating the uplink radio resource assigned to the UE 10A; information indicating whether a transmission acknowledgment signal indicating whether the user data transmitted from the UE 10A has been able to be received is notified via the radio base station 310; information indicating a power control method used in D2D communication; and information indicating received power generated when the UE 10E receives the user data transmitted from the UE 10A.

In the embodiment, the radio base station 310 notifies the UE 10B (the reception-side terminal) of the assignment information of the radio resource used in the D2D communication. When the D2D communication is performed by using the uplink radio resource, the assignment information of the radio resource is D2D scheduling information that is different from the existing uplink scheduling information used in the cellular communication. It is to be noted that the D2D scheduling information is scheduling information used in the D2D communication. The radio base station 310 transmits the D2D scheduling information to the UE 10B by using the individual control channel such as PDCCH. The D2D scheduling information is also called "D2D Scheduling Grants".

Here, the D2D scheduling information includes at least one of: information indicating that the uplink radio resource is used as a reception resource of D2D communication; the identifier of the UE 10A; information indicating the uplink radio resource assigned to the UE 10A; information indicating whether a transmission acknowledgment signal indicating whether the user data transmitted from the UE 10A has been able to be received is notified via the radio base station 310; and information indicating a power control method used in the D2D communication.

However, the radio base station 310 may assign radio resources, at one time, to the UE 10A and UE 10B by using a single control signal by using RNTI that is common to the UE 10A and UE 10B rather than separately using the uplink scheduling information and D2D scheduling information.

(Transmission-Side Terminal)

Figure 7:
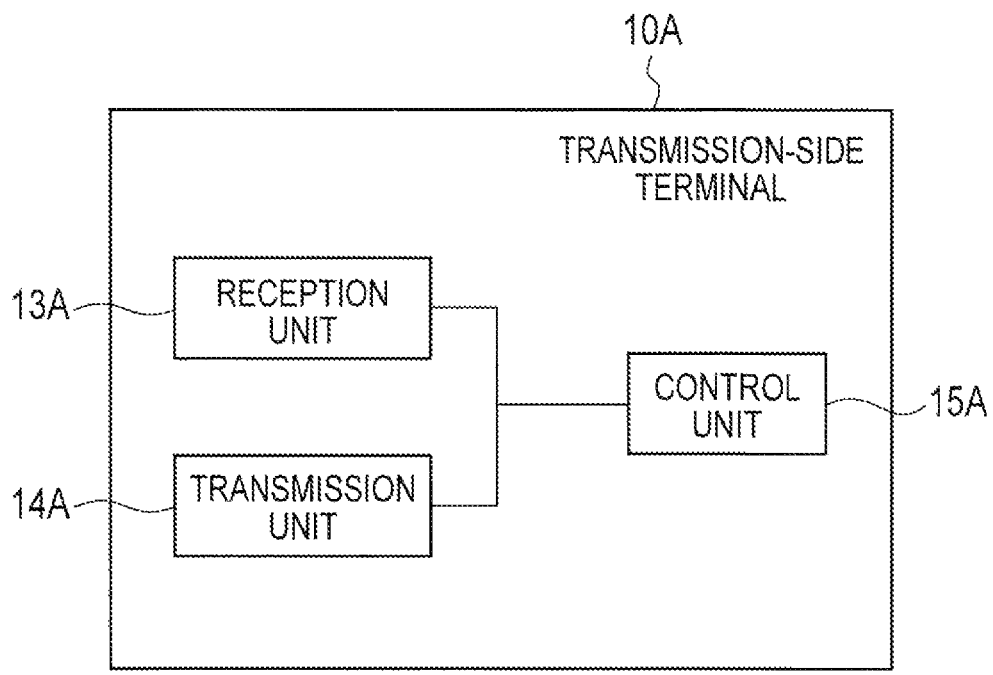
FIG. 7 is a diagram illustrating UE 10A (transmission-side terminal) according to the first embodiment.

Hereinafter, the transmission-side terminal according to the first embodiment will be described. Furthermore, as the transmission-side terminal, the UE 10A is illustrated. FIG. 7 is a block diagram illustrating the UE 10A according to the first embodiment.

As illustrated in FIG. 7, the UE 10A includes a reception unit 13A, a transmission unit 14A, and a control unit 15A.

The reception unit 13A receives data from the radio base station 310 in the communication performed with the radio base station 310 (hereinafter, referred to as cellular communication). The reception unit 13A receives data from the UE 10B in the D2D communication. For example, in the D2D communication, the reception unit 13A may receive, from the UE 10B, a transmission acknowledgment signal (ACK/NACK) indicating whether user data has been able to be received. The reception unit 13A may receive the transmission acknowledgment signal via the radio base station 310 in the D2D communication.

In the embodiment, the reception unit 13A receives a Discovery response from a neighboring terminal located in the neighborhood of the UE 10A. As described above, the Discovery response includes an identifier of a transmission source (the neighboring terminal) of the Discovery response.

The transmission unit 14A transmits data to the radio base station 310 in the cellular communication. The transmission unit 14A transmits data to the UE 10B in the D2D communication. For example, the transmission unit 14A transmits user data to the UE 10B in the D2D communication. Furthermore, the transmission unit 14A retransmits the user data to the UE 10B in response to an instruction output from the control unit 15A.

In the first embodiment, the transmission unit 14A may transmit a D2D control signal for controlling direct communication of user data to the radio base station 310.

The D2D control signal, for example, indicates at least one of: a signal for requesting the switching of the first assignment mode and the second assignment mode; a signal indicating that transmission power used for the communication of the user data has exceeded a threshold value; a signal indicating that the transmission power used for the communication of the user data has become less than the threshold value; a signal indicating that a modulation and coding scheme used for the communication of the user data has become less than the threshold value; and a signal indicating that the modulation and coding scheme used for the communication of the user data has exceeded the threshold value.

In the embodiment, the transmission unit 14A transmits the Discovery signal with predetermined power. As described above, the Discovery signal includes an identifier of a transmission source (the UE 10A) of the Discovery signal. Moreover, the transmission unit 14A transmits the identifier of the neighboring terminal to the radio base station 310 in response to reception of the Discovery response. The transmission unit 14A may transmit information indicating received power of the signal (for example, the Discovery response) transmitted from the neighboring terminal to the radio base station 310, together with the identifier of the neighboring terminal. The received power of the signal transmitted from the neighboring terminal is naturally measured by the UE 10A.

The control unit 15A controls the UE 10A. Specifically, the control unit 15A determines a change in the communication state of the user data communicated directly between the UE 10A and UE 10B.

Here, the case in which it is determined that the communication state is improved indicates the case in which the transmission power used for the communication of the user data has become less than the threshold value or the modulation and coding scheme used for the communication of the user data has exceeded the threshold value. Alternatively, the case in which it is determined that the communication state is improved may indicate the case in which a block error rate has become less than the threshold value, the case in which a packet error rate has become less than the threshold value, the case in which predetermined QoS has been satisfied, the case in which CQI has exceeded the threshold value, and the case in which a processing load of the UE 10A has become less than the threshold value.

Furthermore, the case in which it is determined that the communication state is deteriorated indicates the case in which the transmission power used for the communication of the user data has exceeded the threshold value or the modulation and coding scheme used for the communication of the user data has become less than the threshold value. Alternatively, the case in which it is determined that the communication state is deteriorated may indicate the case in which the block error rate has exceeded the threshold value, the case in which the packet error rate has exceeded the threshold value, the case in which the predetermined QoS has not been satisfied, the case in which the CQI has become less than the threshold value, and the case in which the processing load of the UE 10A has exceeded the threshold value.

Furthermore, when it is determined that the communication state is deteriorated, the control unit 15A instructs the transmission unit 14A to transmit the D2D control signal. When it is determined that the communication state is improved, the control unit 15A instructs the transmission unit 14A to transmit the D2D control signal.

In the first embodiment, when it is determined that the communication state is deteriorated, the assignment mode is switched from the first assignment mode to the second assignment mode by the transmission of the D2D control signal. Meanwhile, when it is determined that the communication state is improved, the assignment mode is switched from the second assignment mode to the first assignment mode by the transmission of the D2D control signal.

(Reception-Side Terminal)

Figure 8:
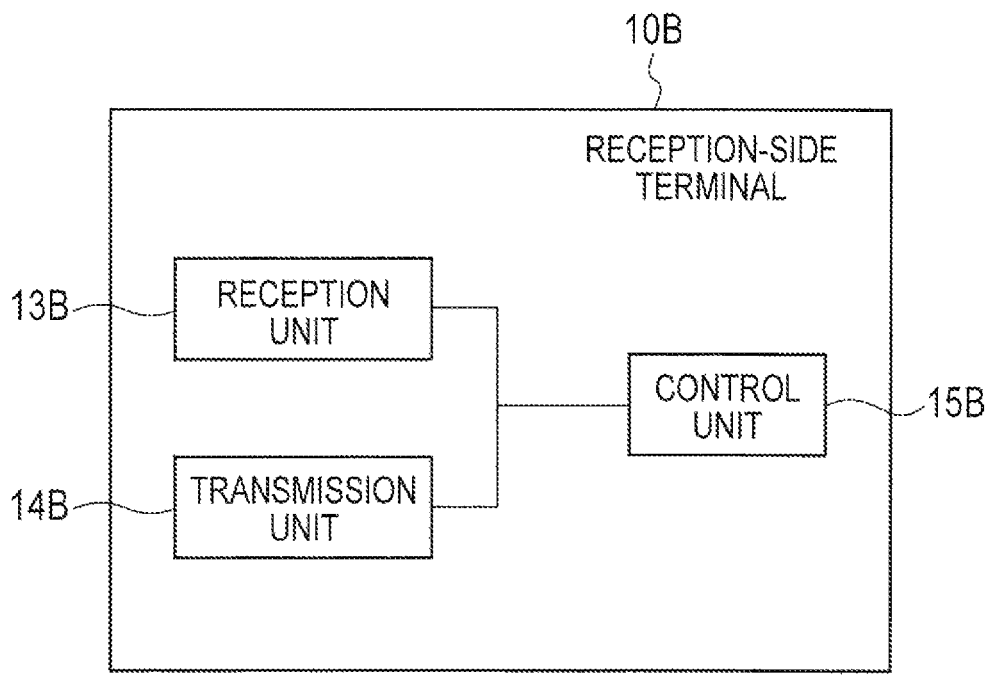
FIG. 8 is a diagram illustrating UE 10B (reception-side terminal) according to the first embodiment.

Hereinafter, the reception-side terminal according to the first embodiment will be described. Furthermore, as the transmission-side terminal, the UE 10B is illustrated. FIG. 8 is a block diagram illustrating the UE 10B according to the first embodiment.

As illustrated in FIG. 8, the UE 10B includes a reception unit 13B, a transmission unit 14B, and a control unit 15B.

The reception unit 13B receives data from the radio base station 310 in the cellular communication. The reception unit 13B receives data from the UE 10A in the D2D communication. For example, in the D2D communication, the reception unit 13B receives user data (initial transmission) transmitted from the UE 10A. Furthermore, the transmission unit 14A receives user data (retransmission) retransmitted from the UE 10A.

In the embodiment, the reception unit 13B receives the Discovery response from the neighboring terminal located in the neighborhood of the UE 10B. As described above, the Discovery response includes an identifier of a transmission source (the neighboring terminal) of the Discovery response.

The transmission unit 14B transmits data to the radio base station 310 in the cellular communication. The transmission unit 14B transmits data to the UE 10A in the D2D communication. For example, the transmission unit 14B may transmit, to the UE 10A, a transmission acknowledgment signal (ACK/NACK) indicating whether user data has been able to be received. The transmission unit 14B may transmit a transmission acknowledgment signal (ACK/NACK) to the user data in the D2D communication to the radio base station 310.

In the embodiment, the transmission unit 14B may transmit a D2D control signal for controlling direct communication of the user data to the radio base station 310. Furthermore, it is sufficient if the D2D control signal is transmitted to the radio base station 310 from at least one of the UE 10A and UE 10B.

In the embodiment, the transmission unit 14B transmits the Discovery signal with predetermined power. As described above, the Discovery signal includes an identifier of a transmission source (the UE 10B) of the Discovery signal. Moreover, the transmission unit 14B transmits an identifier of the neighboring terminal to the radio base station 310 in response to reception of the Discovery response. The transmission unit 14B may transmit information indicating the received power of the signal (for example, the Discovery response) transmitted from the neighboring terminal to the radio base station 310, together with the identifier of the neighboring terminal. The received power of the signal transmitted from the neighboring terminal is naturally measured by the UE 10B.

The control unit 15B controls the UE 10B. Specifically, similarly to the control unit 15A, the control unit 15B determines a change in the communication state of the user data communicated directly between the UE 10A and UE 10B. Similarly to the control unit 15A, when it is determined that the communication state is deteriorated, the control unit 15B instructs the transmission unit 14B to transmit the D2D control signal. Alternatively, similarly to the control unit 15A, when it is determined that the communication state is improved, the control unit 15B instructs the transmission unit 14B to transmit the D2D control signal.

As described above, when it is determined that the communication state is deteriorated, the assignment mode is switched from the first assignment mode to the second assignment mode by the transmission of the D2D control signal. Meanwhile, when it is determined that the communication state is improved, the assignment mode is switched from the second assignment mode to the first assignment mode by the transmission of the D2D control signal.

(Radio Base Station)

Figure 9:
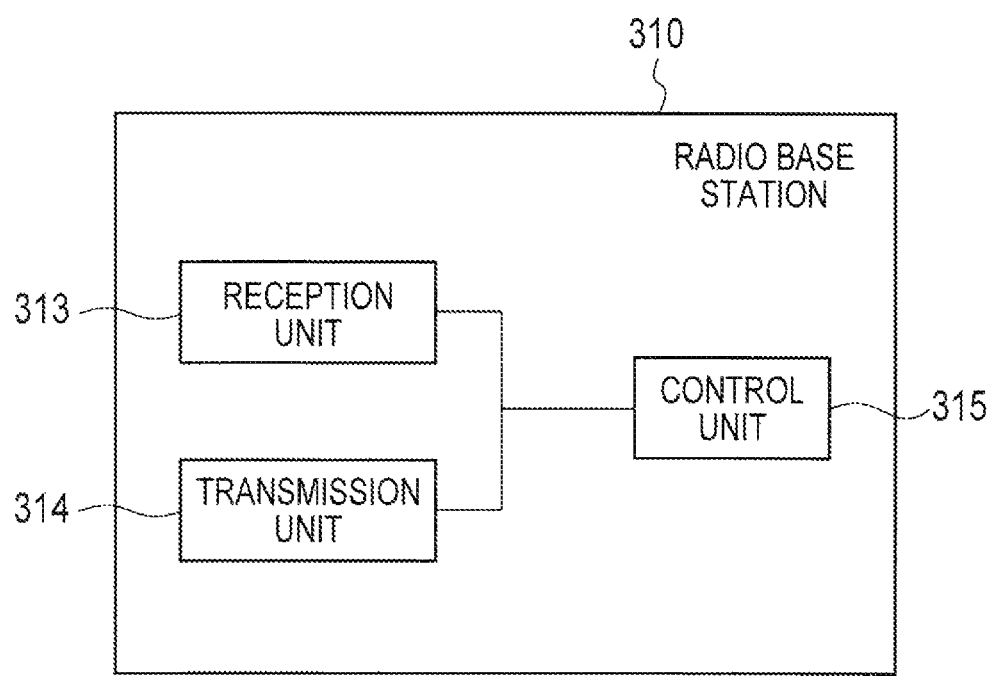
FIG. 9 is a diagram illustrating a radio base station 310 according to the first embodiment.

Hereinafter, the radio base station according to the first embodiment will be described. FIG. 9 is a block diagram illustrating the radio base station 310 according to the first embodiment.

As illustrated in FIG. 9, the radio base station 310 includes a reception unit 313, a transmission unit 314, and a control unit 315.

The reception unit 313 receives data from the UE 10. For example, in the D2D communication, the reception unit 313 receives, from the UE 10B, a transmission acknowledgment signal (ACK/NACK) indicating whether user data has been able to be received. Furthermore, the reception unit 313 may receive the user data transmitted from the UE 10A to the UE 10B.

In the embodiment, the reception unit 313 receives a D2D control signal from the UE 10 (the UE 10A or UE 10B). Moreover, the reception unit 313 receives the identifier of the neighboring terminal located in the neighborhood of the UE 10 (the UE 10A or UE 10B). The reception unit 313 may receive information indicating the received power of the signal (for example, the Discovery response) transmitted from the neighboring terminal, together with the identifier of the neighboring terminal. The received power of the signal transmitted from the neighboring terminal is naturally measured by the UE 10 (the UE 10A or UE 10B).

The transmission unit 314 receives data from the UE 10. For example, when the transmission acknowledgment signal (ACK/NACK) is received from the UE 10B in the D2D communication, in response to the transmission acknowledgment signal (ACK/NACK), the transmission unit 314 transmits the transmission acknowledgment signal to the UE 10A. For example, the transmission unit 314 may relay the transmission acknowledgment signal, which is received from the UE 10B, to the UE 10A. Alternatively, the transmission unit 314 may transmit the transmission acknowledgment signal to the UE 10A, together with a signal for assigning a radio resource used for the communication of user data in the D2D communication to the UE 10A.

The control unit 315 controls the radio base station 310. Specifically, the control unit 315 assigns uplink and downlink radio resources to the UE 10. Furthermore, the control unit 315 may assign the radio resource, which is assigned to the communication of the user data communicated directly between the UE 10A and UE 10B, as the reception resource for receiving the user data. In this way, the radio base station 310 is able to receive the user data communicated directly between the UE 10A and UE 10B.

In the first embodiment, in response to the D2D control signal, the control unit 315 switches the first assignment mode and the second assignment mode. For example, in response to the reception of the D2D control signal indicating that the communication state of the user data communicated directly between the UE 10A and UE 10B is deteriorated, the control unit 315 switches the assignment mode from the first assignment mode to the second assignment mode. That is, the control unit 315 assigns a radio resource for receiving the user data in the D2D communication to the UE 10A and UE 10B.

Meanwhile, in response to the reception of the D2D control signal indicating that the communication state of the user data communicated directly between the UE 10A and UE 10B is improved, the control unit 315 switches the assignment mode from the second assignment mode to the first assignment mode. That is, the control unit 315 does not participate in assigning the radio resource for receiving the user data in the D2D communication.

In the embodiment, in the second assignment mode, the control unit 315 assigns a D2D radio resource to be assigned to the UE 10 or a neighboring terminal radio resource to be assigned to the neighboring terminal on the basis of the identifier of the neighboring terminal received from the UE 10 (the UE 10A or UE 10B). In the second assignment mode, the control unit 315 may assign the D2D radio resource to be assigned to the UE 10 or the neighboring terminal radio resource to be assigned to the neighboring terminal on the basis of the received power of the signal (for example, the Discovery response) transmitted from the neighboring terminal and the identifier of the neighboring terminal.

Specifically, when it is determined that the distance between the UE 10 (the D2D terminal) and the neighboring terminal is smaller than a threshold value, the control unit 315 controls the D2D terminal radio resource or the neighboring terminal radio resource so that the D2D terminal radio resource and the neighboring terminal radio resource do not overlap.

Here, the control unit 315 may determine that the distance between the UE 10 and the neighboring terminal is smaller than the threshold value when the identifier of the neighboring terminal is received. Alternatively, the control unit 315 may determine that the distance between the UE 10 and the neighboring terminal is smaller than the threshold value when the identifier of the neighboring terminal is received and the received power of the signal (for example, the Discovery response) transmitted from the neighboring terminal is larger than a threshold value.

Alternatively, the control unit 315 controls the D2D terminal radio resource or the neighboring terminal radio resource so that the D2D terminal radio resource and the neighboring terminal radio resource overlap when the neighboring terminal performs D2D communication and it is determined that the distance between the UE 10 (the D2D terminal) and the neighboring terminal is larger than the threshold value.

Furthermore, the control unit 315 may determine that the distance between the UE 10 and the neighboring terminal is larger than the threshold value when the identifier of the neighboring terminal is not received. Alternatively, the control unit 315 may determine that the distance between the UE 10 and the neighboring terminal is larger than the threshold value when the identifier of the neighboring terminal is received and the received power of the signal (for example, the Discovery response) transmitted from the neighboring terminal is smaller than the threshold value.

Alternatively, the control unit 315 may control the D2D terminal radio resource or the neighboring terminal radio resource so that the D2D terminal radio resource and the neighboring terminal radio resource do not overlap when the neighboring terminal performs cellular communication and it is determined that the distance between the neighboring terminal and the radio base station 310 is larger than the distance between the UE 10 (the D2D terminal) and the radio base station 310.

Alternatively, the control unit 315 may control the D2D terminal radio resource or the neighboring terminal radio resource so that the D2D terminal radio resource and the neighboring terminal radio resource overlap when the neighboring terminal performs cellular communication and it is determined that the distance between the neighboring terminal and the radio base station 310 is smaller than the distance between the UE 10 (the D2D terminal) and the radio base station 310.

(Example of Scheduling)

Figure 10:
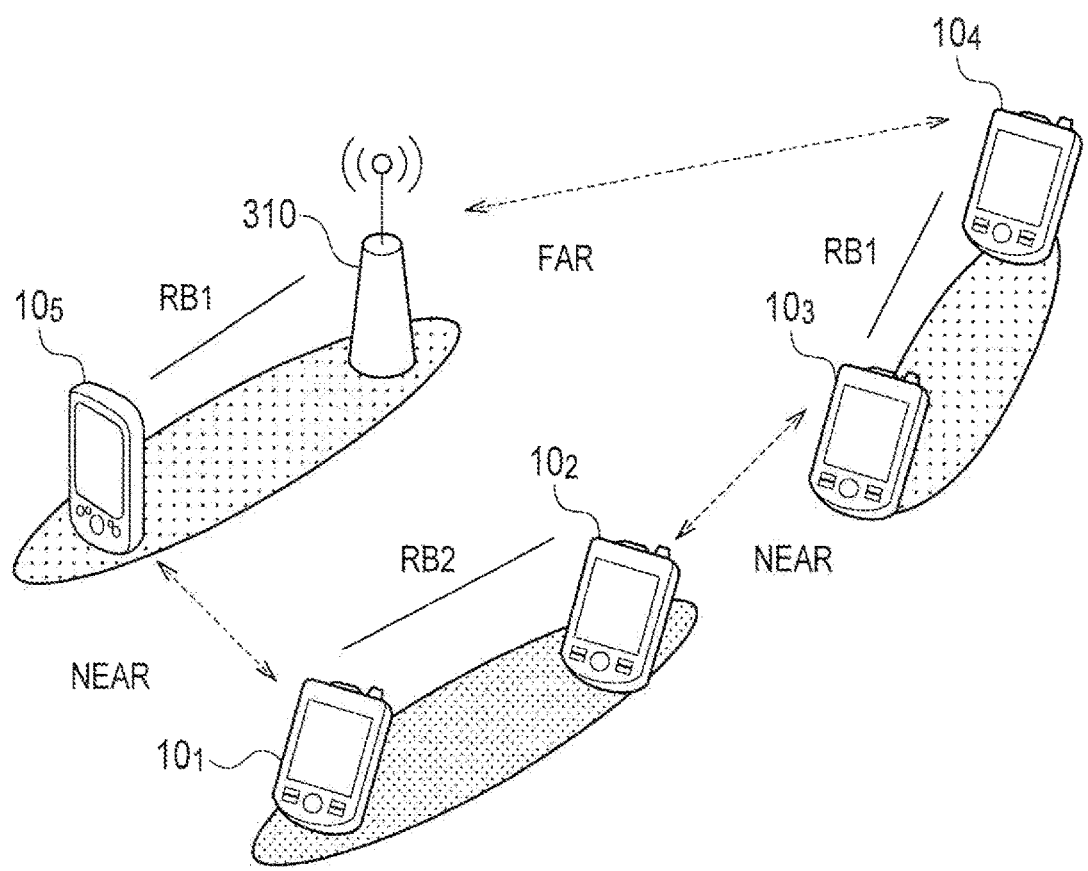
FIG. 10 is a diagram illustrating an example of scheduling according to the first embodiment.
Figure 11:
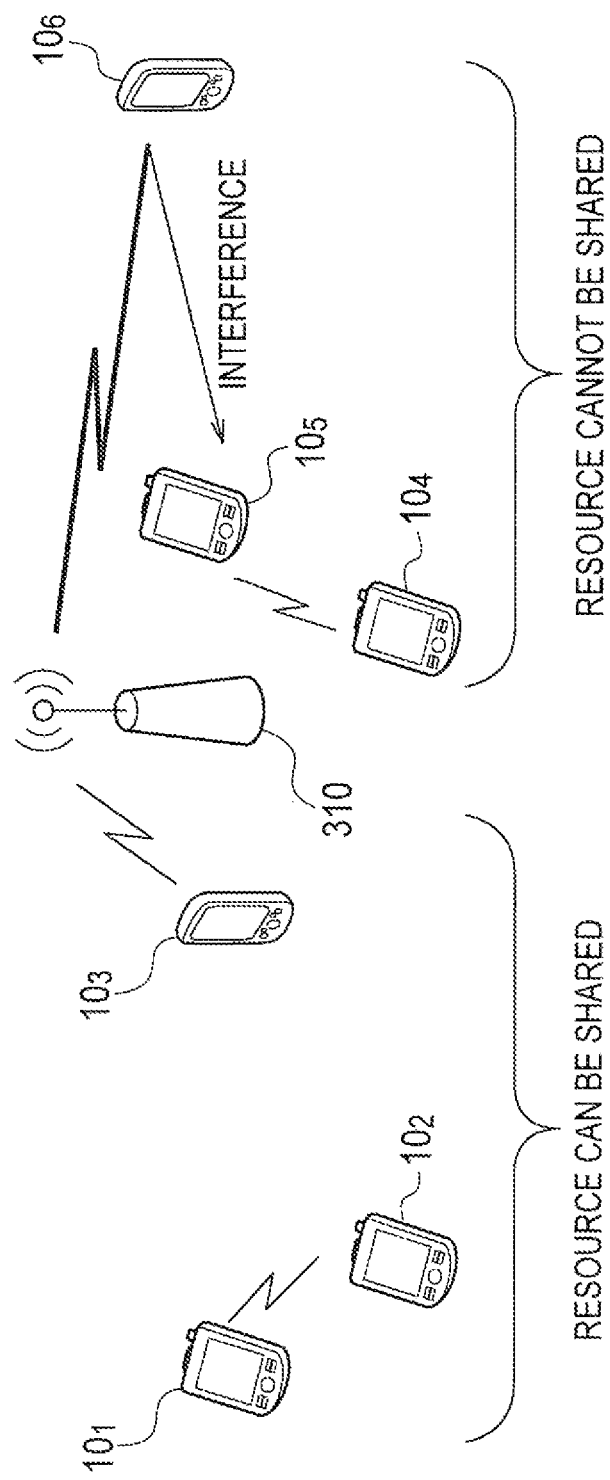
FIG. 11 is a diagram illustrating an example of scheduling according to the first embodiment.

Hereinafter, an example of scheduling according to the first embodiment will be described. FIGS. 10 and 11 are diagrams for explaining an example of scheduling according to the first embodiment.

First, as illustrated in FIG. 10, a case where UE $10_1$ and UE $10_2$ perform D2D communication, UE $10_3$ and UE $10_4$ perform another D2D communication, and UE $10_5$ performs cellular communication will be described.

In such a case, since the distance between the UE $10_1$ (the D2D terminal) and the UE $10_5$ (the neighboring terminal) is smaller than a threshold value, the radio base station 310 controls radio resources so that a radio resource (RB2) assigned to the UE $10_1$ (the D2D terminal) and a radio resource (RB1) assigned to the UE $10_5$ (the neighboring terminal) do not overlap.

Moreover, since the distance between the UE $10_2$ (the D2D terminal) and the UE $10_3$ (the neighboring terminal) is smaller than the threshold value, the radio base station 310 controls radio resources so that the radio resource (RB2) assigned to the UE $10_2$ (the D2D terminal) and the radio resource (RB1) assigned to the UE $10_3$ (the neighboring terminal) do not overlap.

However, since the distance between the UE $10_3$ (the D2D terminal) or the UE $10_4$ (the D2D terminal) and the UE $10_5$ (the neighboring terminal) is larger than the threshold value, the radio base station 310 may control the radio resources so that the radio resource (RB1) assigned to the UE $10_3$ and the UE $10_4$ (the D2D terminals) and the radio resource (RB1) assigned to the UE $10_5$ (the neighboring terminal) overlap.

Second, as illustrated in FIG. 11, a case where the UE $10_1$ and the UE $10_2$ perform D2D communication, the UE $10_3$ performs cellular communication, the UE $10_4$ and the UE $10_5$ perform another D2D communication, and UE $10_6$ performs cellular communication will be described.

In such a case, since the distance between the UE $10_3$ (the neighboring terminal) and the radio base station 310 is smaller than the distance between the UE $10_1$ and the UE $10_2$ (the D2D terminals), and the radio base station 310, the radio base station 310 may control radio resources so that the radio resource assigned to the UE $10_1$ and the UE $10_2$ (the D2D terminals) and the radio resource (RB1) assigned to the UE $10_3$ (the neighboring terminal) overlap.

In such a case, it is considered that since the transmission power used for the communication of the UE $10_3$ (the neighboring terminal) may be small, even when the above-described radio resource control is performed, the interference between the communication (D2D communication) of the UE $10_1$ and the UE $10_2$ and the communication (cellular communication) of the UE $10_3$ (the neighboring terminal) may be suppressed.

On the other hand, since the distance between the UE $10_6$ (the neighboring terminal) and the radio base station 310 is larger than the distance between the UE $10_4$ and the UE $10_5$ (the D2D terminals) and the radio base station 310, the radio base station 310 controls the radio resources so that the radio resource assigned to the UE $10_4$ and the UE $10_5$ (the D2D terminals) and the radio resource (RB1) assigned to the UE $10_6$ (the neighboring terminal) do not overlap.

In such a case, although the transmission power used for the communication of the UE $10_6$ (the neighboring terminal) may be large, the interference between the communication (D2D communication) of the UE $10_4$ and the UE $10_6$ and the communication (cellular communication) of the UE $10_6$ (the neighboring terminal) is suppressed by the above-described radio resource control.

(Mobile Communication Method)

Hereinafter, a mobile communication method according to the first embodiment will be described. FIG. 12 is a diagram illustrating a mobile communication method according to the first embodiment. In FIG. 12, it is to be noted that the second assignment mode is used.

As illustrated in FIG. 12, in step 10, the UE 10 detects a neighboring terminal located in the neighborhood of the UE 10. For example, the UE 10 broadcasts a signal (the Discovery signal) with predetermined power for detecting a neighboring terminal capable of performing D2D communication. The Discovery signal includes an identifier of a transmission source.

When the neighboring terminal is present, the UE 10 receives a Discovery response from the neighboring terminal as a response to the Discovery signal. The Discovery response includes an identifier of the transmission source (namely, the neighboring terminal).

In step 20, the UE 10 transmits an identifier of the neighboring terminal to the radio base station 310. The UE 10 may transmit information indicating the received power of the signal (for example, the Discovery response) transmitted from the neighboring terminal to the radio base station 310, together with the identifier of the neighboring terminal.

In step 30, the radio base station 310 assigns a D2D radio resource to be assigned to the UE 10 or a neighboring terminal radio resource to be assigned to the neighboring terminal (scheduling). Specifically, the radio base station 310 performs radio resource assignment illustrated in FIGS. 10 and 11.

(Operation and Effect)

In the first embodiment, the UE 10 (the D2D terminal) can notify the radio base station 310 of an identifier of a neighboring terminal, and the radio base station 310 can specify a distribution of the UEs 10 present in a cell managed by the radio base station 310 with a certain degree of accuracy. Such a distribution is useful when used in radio resource scheduling, SON (Self Organizing Network), or MDT (Minimization of Drive Tests).

Moreover, the radio base station 310 controls the D2D terminal radio resource to be assigned to the UE 10 (the D2D terminal) or the neighboring terminal radio resource assigned to be the neighboring terminal on the basis of the identifier of the neighboring terminal. Thus, it is possible to suppress the interference to the communication performed by the neighboring terminal due to D2D communication or the interference to the D2D communication due to the communication performed by the neighboring terminal.

[First Modification]

Hereinafter, a first modification of the first embodiment is explained. In the first modification, the radio base station 310 designates whether it is necessary to notify of the received power of the signal (for example, the Discovery response) transmitted from the neighboring terminal. In other words, the radio base station 310 designates whether the UE 10 notifies of the received power of the signal transmitted from the neighboring terminal.

In the first modification, the UE 10 is configured to notify the radio base station 310 of the received power of the signal (for example, the Discovery response) transmitted from the neighboring terminal as a default operation.

Specifically, as illustrated in FIG. 13, in step 110, the UE 10 detects a neighboring terminal located in the neighborhood of the UE 10. Specifically, the UE 10 broadcasts a signal (the Discovery signal) with predetermined power for detecting a neighboring terminal capable of performing D2D communication. When the neighboring terminal is present, the UE 10 receives a Discovery response from the neighboring terminal as a response to the Discovery signal.

In step 120, the radio base station 310 notifies the UE 10 of the fact that it is not necessary to notify of the received power (notification OFF request). For example, when it is desired to suppress overhead (consumption of radio resources) accompanied by notification of the received power, the radio base station 310 notifies the UE 10 of the notification OFF request. The case where overhead is to be suppressed, for example, is a case where a large number of received power notifications may occur. The notification OFF request is transmitted using a broadcast channel such as SIB, for example.

In step 130, the UE 10 transmits the identifier of the neighboring terminal to the radio base station 310. However, the UE 10 does not transmit the information indicating the received power of the signal (for example, the Discovery response) transmitted from the neighboring terminal to the radio base station 310.

In step 140, the radio base station 310 assigns the D2D radio resource to be assigned to the UE 10 or the neighboring terminal radio resource to be assigned to the neighboring terminal (scheduling). Specifically, the radio base station 310 performs radio resource assignment illustrated in FIGS. 10 and 11.

Furthermore, the radio base station 310 may notify the UE 10 of the fact that the notification of the received power is required (notification ON request) after the radio base station 310 notifies the UE 10 of the notification OFF request, for example, when an usage rate of a radio resource is below a threshold value.

[Second Modification]

A description will be given below of a second modification of the first embodiment. In the second modification, the UE 10 notifies the radio base station 310 of the received power in response to the result of comparison between the received power of the signal (for example, the Discovery response) transmitted from the neighboring terminal and a threshold value. For example, when the received power is larger than the threshold value, the UE 10 notifies the radio base station 310 of the received power. On the other hand, when the received power is smaller than the threshold value, the UE 10 does not notify the radio base station 310 of the received power.

Furthermore, the UE 10 may notify the radio base station 310 of the identifier of the neighboring terminal when the received power is larger than the threshold value. On the other hand, the UE 10 may not notify the radio base station 310 of the identifier of the neighboring terminal when the received power is smaller than the threshold value.

In addition, the threshold value compared with the received power is notified from the radio base station 310 to the UE 10. The threshold value may be broadcast using a broadcast channel such as SIB and may be transmitted to the UE 10 by using an individual control channel such as PDCCH.

Specifically, as illustrated in FIG. 14, in step 210, the radio base station 310 notifies the UE 10 of the threshold value to be compared with the received power of the signal (for example, the Discovery response) transmitted from the neighboring terminal.

Furthermore, the radio base station 310 notifies the UE 10 of an offset value of the threshold value and/or a determination time range (TimeToTrigger) indicating a time range in which the UE 10 determines whether the received power is larger than the threshold value, together with the threshold value.

In step 220, the UE 10 detects a neighboring terminal located in the neighborhood of the UE 10. Specifically, the UE 10 broadcasts a signal (the Discovery signal) with predetermined power for detecting a neighboring terminal capable of performing D2D communication. When the neighboring terminal is present, the UE 10 receives a Discovery response from the neighboring terminal as a response to the Discovery signal.

In step 230, the UE 10 determines whether the received power of the signal (for example, the Discovery response) transmitted from the neighboring terminal is larger than a threshold value. If the determination result is "YES", the UE 10 performs the process in step 240. On the other hand, when the determination result is "NO", the UE 10 ends the series of processes.

Furthermore, the UE 10 determines whether the received power of the signal from the neighboring terminal is larger than the threshold value on the basis of the offset value and/or the determination time range when the UE 10 is notified of the offset value and/or the determination time range.

In step 240, the UE 10 transmits information indicating the received power of the signal (for example, the Discovery response) transmitted from the neighboring terminal to the radio base station 310, together with the identifier of the neighboring terminal.

In step 250, the radio base station 310 assigns the D2D radio resource to be assigned to the UE 10 or the neighboring terminal radio resource to be assigned to the neighboring terminal (scheduling). Specifically, the radio base station 310 performs radio resource assignment illustrated in FIGS. 10 and 11.

[Third Modification]

A description will be given below of a third modification of the first embodiment. In the third modification, the UE 10 notifies the radio base station 310 of an identifier of a neighboring terminal at a predetermined cycle. The predetermined cycle in which the identifier of the neighboring terminal is notified of is notified from the radio base station 310. The predetermined cycle may be broadcast using a broadcast channel such as SIB and may be transmitted to the UE 10 by using an individual control channel such as PDCCH.

Specifically, as illustrated in FIG. 15, in step 310, the radio base station 310 notifies the UE 10 of the predetermined cycle in which the identifier of the neighboring terminal is notified of.

In step 320, the UE 10 detects a neighboring terminal located in the neighborhood of the UE 10. Specifically, the UE 10 broadcasts a signal (the Discovery signal) with predetermined power for detecting a neighboring terminal capable of performing D2D communication. When the neighboring terminal is present, the UE 10 receives a Discovery response from the neighboring terminal as a response to the Discovery signal.

In step 330, the UE 10 transmits the identifier of the neighboring terminal to the radio base station 310 according to the predetermined cycle notified from the radio base station 310. Here, the UE 10 may transmit information indicating the received power of the signal (for example, the Discovery response) transmitted from the neighboring terminal to the radio base station 310, together with the identifier of the neighboring terminal.

In step 340, the radio base station 310 assigns a D2D radio resource to be assigned to the UE 10 or a neighboring terminal radio resource to be assigned to the neighboring terminal (scheduling). Specifically, the radio base station 310 performs radio resource assignment illustrated in FIGS. 10 and 11.

[Fourth Modification]

A description will be given below of a fourth modification of the first embodiment. In the fourth modification, the UE 10 notifies the radio base station 310 of the identifier of the neighboring terminal in response to an instruction (information notification request) from the radio base station 310.

Figure 16:
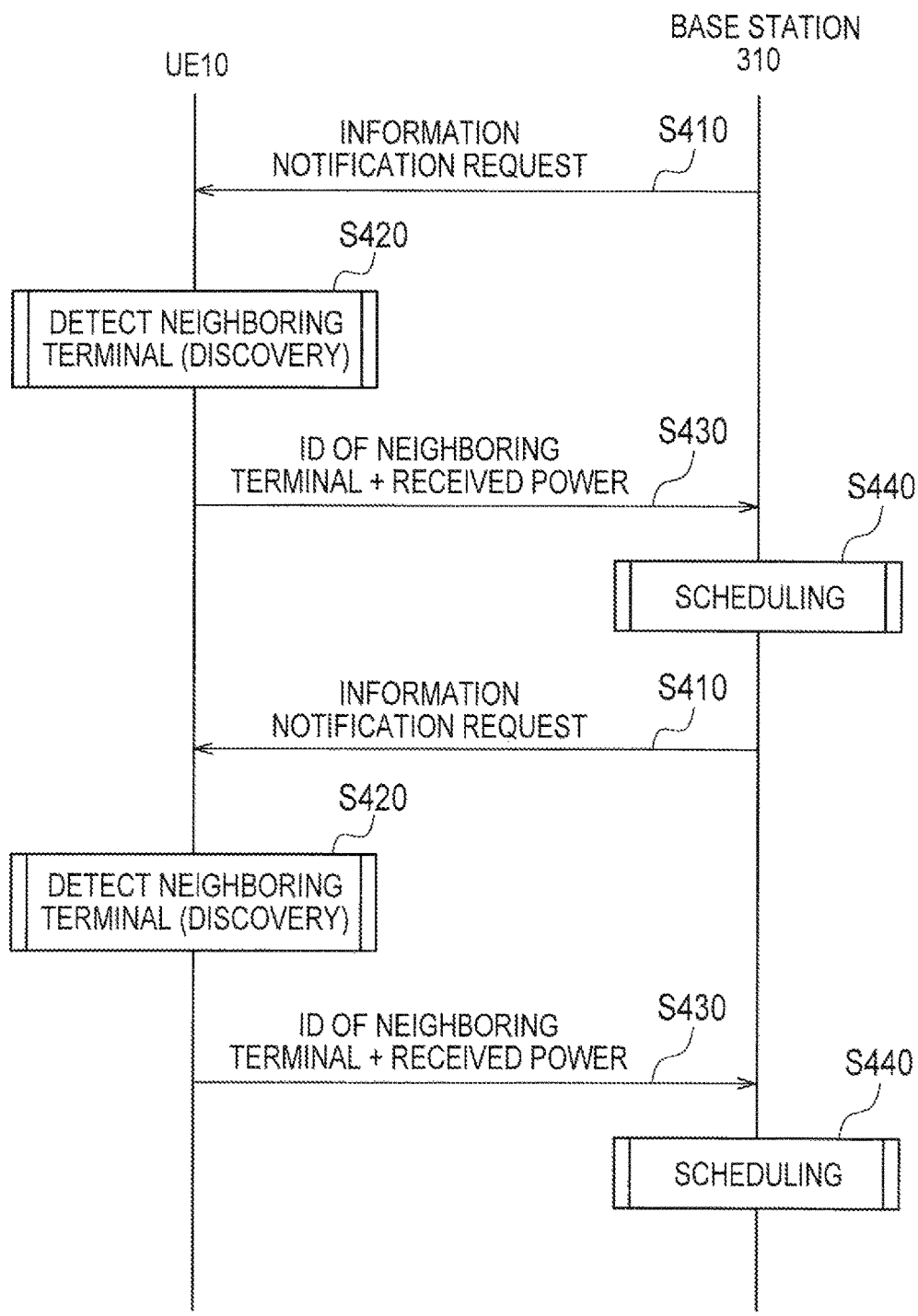
FIG. 16 is a sequence diagram illustrating the operation of the mobile communication system 100 according to a fourth modification.

Specifically, as illustrated in FIG. 16, in step 410, the radio base station 310 notifies the UE 10 of an instruction (information notification request) that requests a notification of the identifier of the neighboring terminal.

In step 420, the UE 10 detects a neighboring terminal located in the neighborhood of the UE 10. Specifically, the UE 10 broadcasts a signal (the Discovery signal) with predetermined power for detecting a neighboring terminal capable of performing D2D communication. When the neighboring terminal is present, the UE 10 receives a Discovery response from the neighboring terminal as a response to the Discovery signal.

In step 430, the UE 10 transmits the identifier of the neighboring terminal to the radio base station 310 in response to the instruction (information notification request) from the radio base station 310. Here, the UE 10 may transmit information indicating the received power of the signal (for example, the Discovery response) transmitted from the neighboring terminal to the radio base station 310, together with the identifier of the neighboring terminal.

In step 440, the radio base station 310 assigns the D2D radio resource to be assigned to the UE 10 or the neighboring terminal radio resource to be assigned to the neighboring terminal (scheduling). Specifically, the radio base station 310 performs radio resource assignment illustrated in FIGS. 10 and 11.

[Fifth Modification]

Hereinafter, a fifth modification of the first embodiment is explained. In the fifth embodiment, the radio base station 310 (hereinafter, referred to as radio base station 310A) notifies another radio base station 310 (hereinafter, referred to as radio base station 310B) of the identifier of the neighboring terminal. Here, the radio base station 310A may notify the radio base station 310B of information indicating the received power of the signal (for example, the Discovery response) transmitted from the neighboring terminal, together with the identifier of the neighboring terminal. Alternatively, the radio base station 310A may notify the radio base station 310B of the identifier of the UE 10, together with the identifier of the neighboring terminal.

Figure 17:
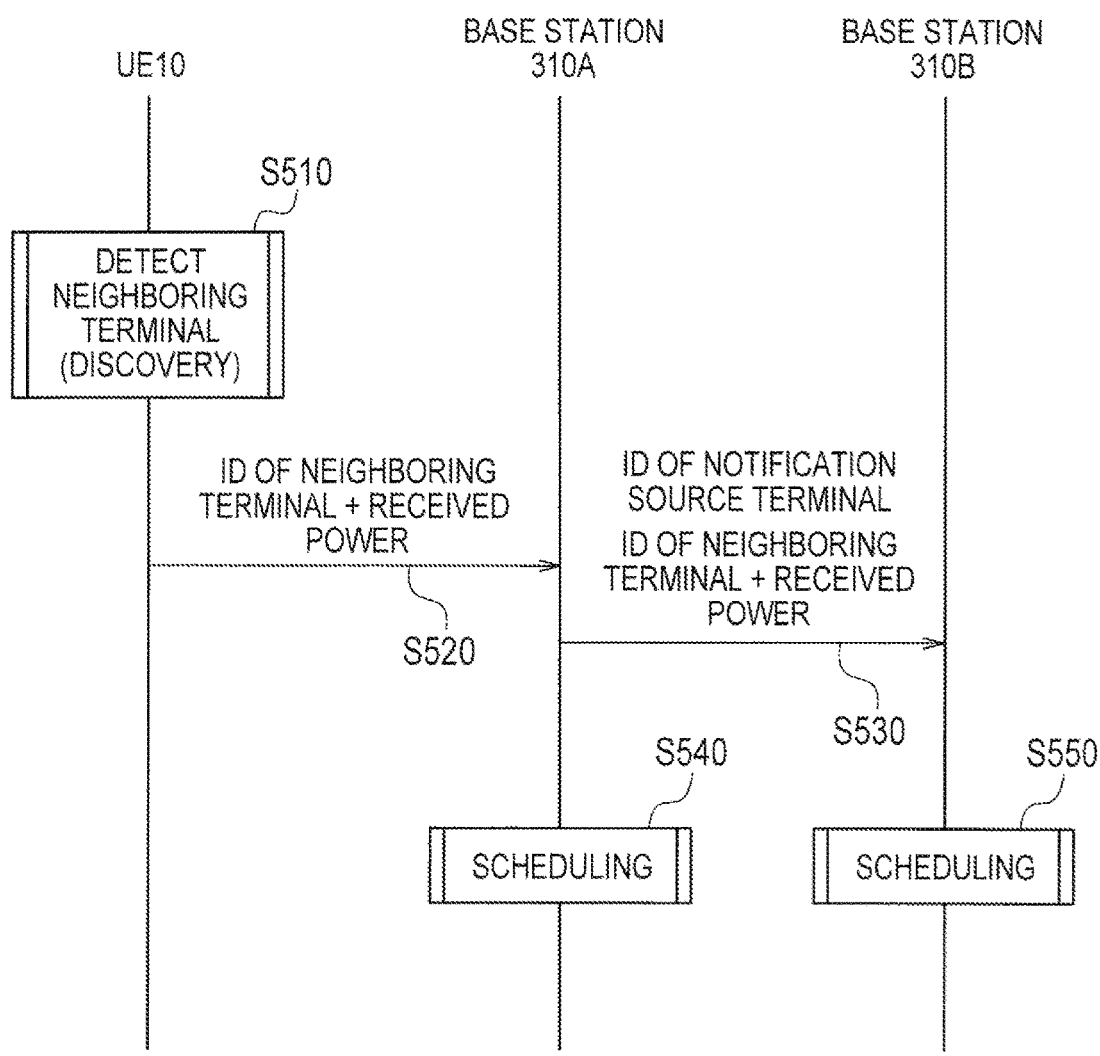
FIG. 17 is a sequence diagram illustrating the operation of the mobile communication system 100 according to a fifth modification.

Specifically, as illustrated in FIG. 17, in step 510, the UE 10 detects a neighboring terminal located in the neighborhood of the UE 10. Specifically, the UE 10 broadcasts a signal (the Discovery signal) with predetermined power for detecting a neighboring terminal capable of performing D2D communication. When the neighboring terminal is present, the UE 10 receives a Discovery response from the neighboring terminal as a response to the Discovery signal.

In step 520, the UE 10 transmits the identifier of the neighboring terminal to the radio base station 310A. Here, the UE 10 may transmit information indicating the received power of the signal (for example, the Discovery response) transmitted from the neighboring terminal to the radio base station 310A, together with the identifier of the neighboring terminal.

In step 530, the radio base station 310A notifies the radio base station 310B of the identifier of the neighboring terminal. Here, the radio base station 310A may notify the radio base station 310B of information (that is, the identifier of the UE 10) indicating the received power of the signal (for example, the Discovery response) transmitted from the neighboring terminal, together with the identifier of the neighboring terminal.

The radio base station 310A may notify the radio base station 310B of the identifier of the neighboring terminal on the basis of notification from the UE 10. The radio base station 310A may notify (respond to) the radio base station 310B of the identifier of the neighboring terminal on the basis of a request from the radio base station 310B.

In step 540, the radio base station 310A assigns a D2D radio resource to be assigned to the UE 10 or a neighboring terminal radio resource to be assigned to the neighboring terminal (scheduling). Specifically, the radio base station 310 performs radio resource assignment illustrated in FIGS. 10 and 11.

In step 550, the radio base station 310B assigns a D2D radio resource to be assigned to the UE 10 or a neighboring terminal radio resource to be assigned to the neighboring terminal (scheduling). Specifically, the radio base station 310 performs radio resource assignment illustrated in FIGS. 10 and 11.

[Sixth Modification]

A description will be given below of a sixth modification of the first embodiment. In the sixth modification, the radio base station 310 specifies a distribution of the UEs 10 present in a cell managed by the radio base station 310 on the basis of the identifier of the neighboring terminal received from the UE 10 and TA (Timing Advance) of the UE 10.

Specifically, first, the radio base station 310 specifies the position of the UE 10 on a concentric circle around the radio base station 310 on the basis of the TA of the UE 10. Here, if the TA values of the UEs 10 are the same, it is possible to plot the respective UEs 10 on the concentric circle around the radio base station 310.

Second, the radio base station 310 specifies the distance between the UE 10 and the neighboring terminal on the basis of the identifier of a neighboring terminal having the same TA as that of the UE 10 and plots the neighboring terminal on the concentric circle. In this stage, the radio base station 310 cannot specify whether the neighboring terminal is present in the clockwise direction or in the counterclockwise direction on the concentric circle.

Third, the radio base station 310 sequentially specifies the positions of neighboring terminals of the plurality of UEs 10 present in the cell present within the radio base station 310. In this way, the radio base station 310 can specify the positional relationship of the plurality of UEs 10 present in the cell present within the radio base station 310 with a certain degree of accuracy.

Figure 18:
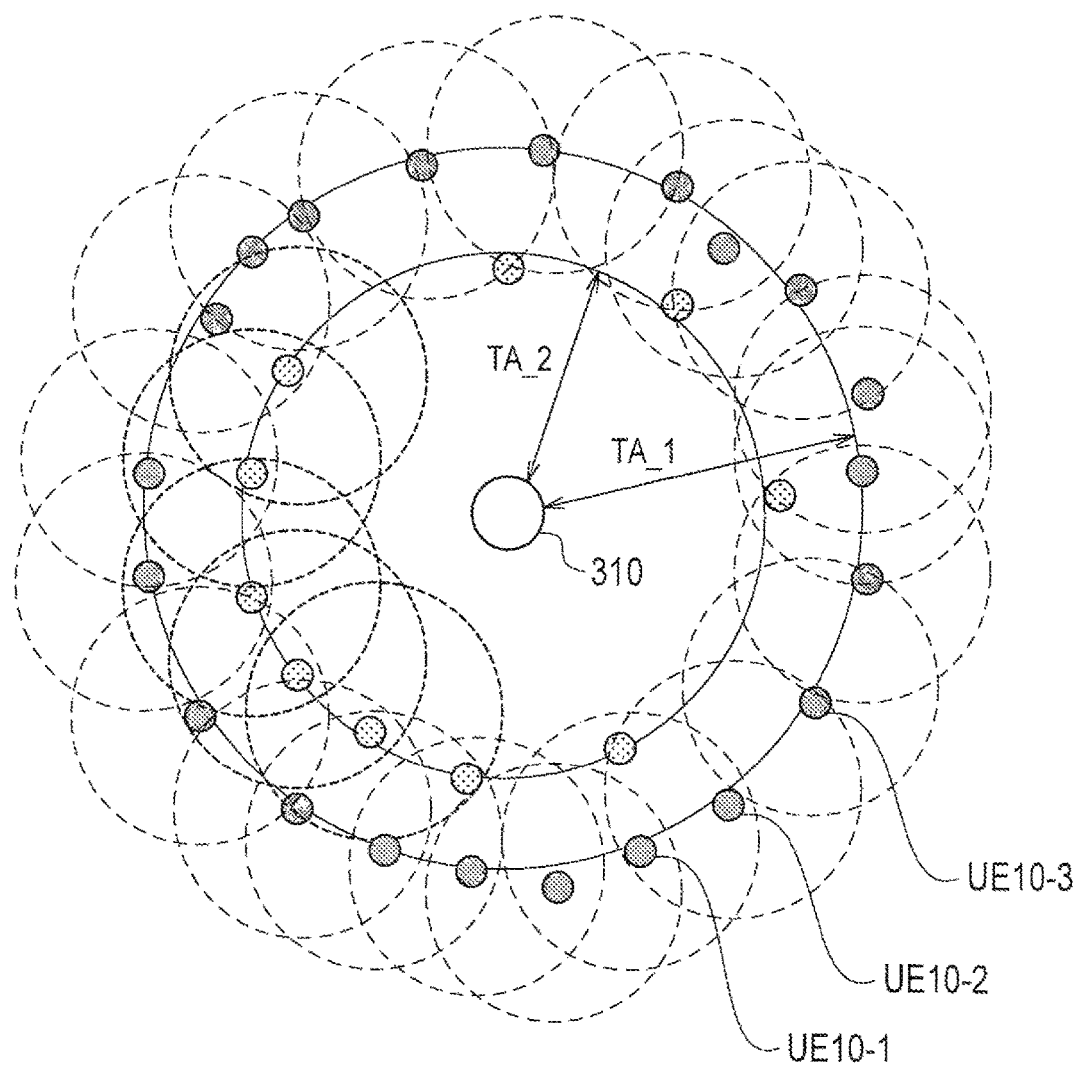
FIG. 18 is a diagram for explaining a method of specifying distribution of UEs 10 according to a sixth modification.

For example, as illustrated in FIG. 18, the plurality of UEs 10 present in the cell present within the radio base station 310 is plotted on different concentric circles for the respective TA values. In addition, the positions of the neighboring terminals of the plurality of UEs 10 present in the cell present within the radio base station 310 are sequentially specified on the basis of the identifier of the neighboring terminal, by transmitting identifier(s) of the neighboring terminal from each of the plurality of UEs 10 (for example, transmitting the identifier of the UE 10-2 being the neighboring terminal from the UE 10-1 and transmitting the identifier of the UE 10-3 being the neighboring terminal from the UE 10-2). In this way, the positional relationship (in particular, the relative positional relationship) of the plurality of UEs 10 present in the cell present within the radio base station 310 is specified with a certain degree of accuracy.

[Seventh Modification]

A description will be given below of a seventh modification of the first embodiment. In the seventh modification, the radio base station 310 specifies a distribution of UEs 10 present in the cell managed by the radio base station 310 on the basis of the identifier of the neighboring terminal received from the UE 10 and the received power of the signal (for example, the Discovery response) transmitted from the neighboring terminal.

Specifically, as illustrated in FIG. 19, a case where UE $10_A$, UE $10_B$, and UE $10_C$ are present in the cell managed by the radio base station 310 is illustrated. Here, the radio base station 310 specifies the UE $10_B$ and UE $10_C$ as the neighboring terminals of the UE $10_A$, specifies a distance 2 between the UE $10_A$ and UE $10_B$ on the basis of the received power of a signal that the UE $10_A$ receives from the UE $10_B$, and specifies a distance 1 between the UE $10_A$ and UE $10_C$ on the basis of the received power of a signal that the UE $10_A$ receives from the UE $10_C$. Similarly, the radio base station 310 specifies the distance 2 between the UE $10_A$ and UE $10_B$ and the distance 3 between the UE $10_B$ and UE $10_C$ and specifies the distance 1 between the UE $10_A$ and UE $10_C$ and the distance 3 between the UE $10_B$ and UE $10_C$.

In this way, it is possible to specify the positional relationship between the UE $10_A$, UE $10_B$, and UE $10_C$, and the distribution of the UEs 10 present in the cell managed by the radio base station 310 is specified.

[Eighth Modification]

Figure 20:
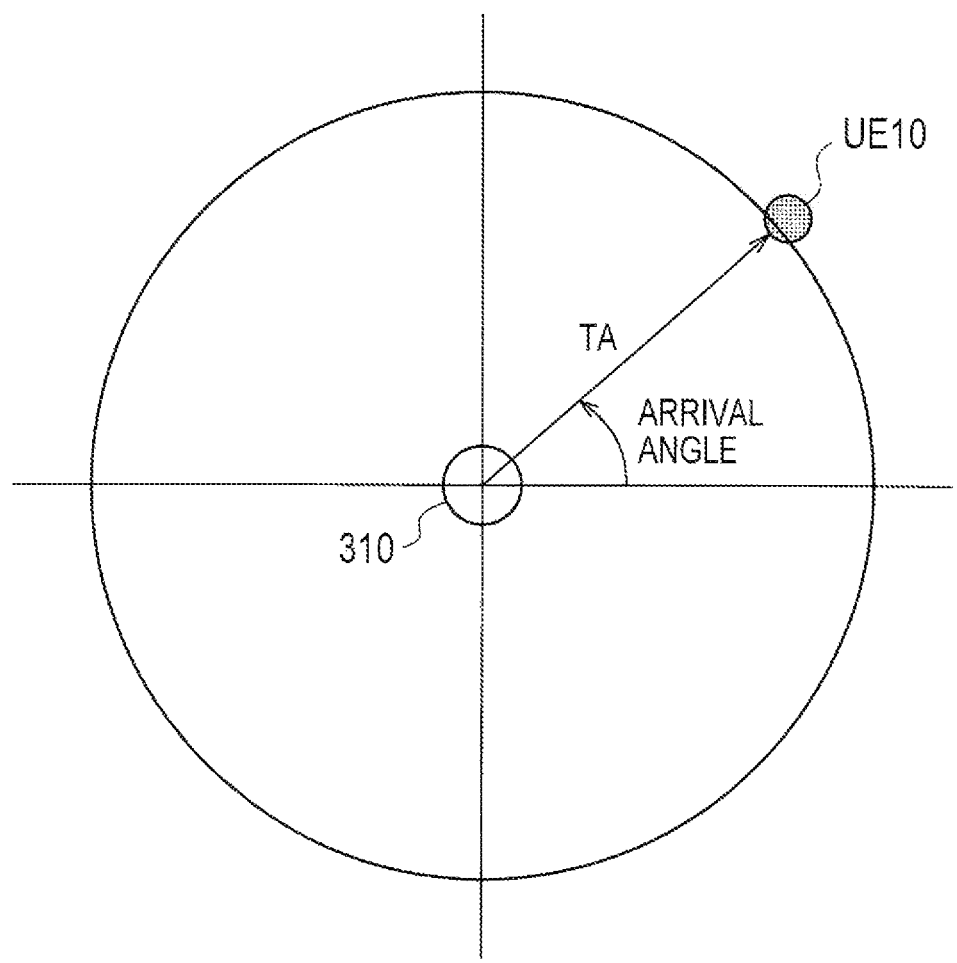
FIG. 20 is a diagram for explaining a method of specifying distribution of UEs 10 according to an eighth modification.

A description will be given below of an eighth modification of the first embodiment. In the eighth modification, as illustrated in FIG. 20, the radio base station 310 specifies the position of the UE 10 on the basis of TA and the arrival angle of TA. Specifically, the radio base station 310 specifies the distance between the radio base station 310 and the UE 10 on the basis of TA and specifies the direction in which the UE 10 is present on the basis of the arrival angle of TA. In this way, the accuracy of specifying the position of the UE 10 present in the cell managed by the radio base station 310 is improved.

Other Embodiments

The present disclosure is explained through the above embodiment, but it must not be understood that this disclosure is limited by the statements and the drawings constituting a part of this disclosure. From this disclosure, various alternative embodiments, examples, and operational technologies will become apparent to those skilled in the art.

The embodiment has described the case in which the two UEs 10 communicate with each other in the D2D communication. However, the embodiment is not limited thereto. Specifically, in the D2D communication, three or more UEs 10 may communicate with one another.

Although it is not particularly mentioned in the embodiment, by combining at least two of the sixth to eighth modifications, the accuracy of specifying the distribution of the UEs 10 present in the cell managed by the radio base station 310 may be improved.

In the embodiment, the radio base station 310 specifies the distribution of the UEs 10 present in the cell managed by the radio base station 310. However, the embodiment is not limited thereto. The distribution of the UEs 10 present in the cell managed by the radio base station 310 may be specified by a node (for example, the network device 330) higher than the radio base station 310. In such a case, the information such as the identifier of the UE 10, the TA of the UE 10, the identifier of the neighboring terminal, and the received power of the signal (for example, the Discovery response) transmitted from the neighboring terminal is notified from the radio base station 310 to the upper node.

In the embodiment and the first modification to the fifth modification, the UE 10 notifies the radio base station 310 of the identifier of the neighboring terminal and the information indicating the received power of the signal (for example, the Discovery response) transmitted from the neighboring terminal in response to the Discovery response received from the neighboring terminal. However, the embodiment is not limited thereto. Specifically, the neighboring terminal may notify the radio base station 310 of the identifier of the UE 10 included in the Discovery signal and the information indicating the received power of the signal (for example, the Discovery signal) transmitted from the UE 10 in response to the Discovery signal received from the UE 10 (the D2D terminal).

In the embodiment, the threshold value compared with the received power of the signal (for example, the Discovery response) transmitted from the neighboring terminal is notified from the radio base station 310. However, the embodiment is not limited thereto. The threshold value compared with the received power of the signal (for example, the Discovery response) transmitted from the neighboring terminal may be determined in advance.

Although it is not particularly mentioned in the embodiment, the distribution of the UEs 10 present in the cell managed by the radio base station 310 is useful when used in SON (Self Organizing Network) or MDT (Minimization of Drive Tests). Moreover, the distribution of the UEs 10 present in the cell managed by the radio base station 310 may be used in radio resource scheduling.

In the embodiment, the UE 10 (the UE 10A or UE 10B) determines a change in the communication state of the user data communicated directly between the UE 10A and UE 10B. However, the embodiment is not limited thereto. Specifically, the radio base station 310 may determine the change in the communication state of the user data communicated directly between the UE 10A and UE 10B.

In such a case, on the basis of the D2D control signal received from the UE 10 (the UE 10A or UE 10B), the radio base station 310 determines the change in the communication state of the user data communicated directly between the UE 10A and UE 10B. The D2D control signal is a signal indicating the transmission power used for the communication of the user data or a signal indicating the modulation and coding scheme used for the communication of the user data.

In the embodiment, the change in the communication state of the user data communicated directly between the UE 10A and UE 10B is mainly determined on the basis of the transmission power used for the communication of the user data or a modulation and coding scheme used for the communication of the user data. However, the embodiment is not limited thereto. The change in the communication state of the user data communicated directly between the UE 10A and UE 10B may be determined on the basis of whether a block error rate, a packet error rate, and a predetermined QoS are satisfied, and any one of the CQI and the processing load of the UE 10.

For example, in the case in which the UE 10 (the UE 10A or UE 10B) determines the change in the communication state of the user data, the D2D control signal indicates at least one of: a signal indicating that a block error rate related to the D2D communication exceeds the threshold value; a signal indicating that the block error rate related to the D2D communication becomes less than the threshold value; a signal indicating that a packet error rate related to the D2D communication exceeds the threshold value, a signal indicating that the packet error rate related to the D2D communication becomes less than the threshold value; a signal indicating whether predetermined QoS related to the D2D communication is satisfied, a signal indicating that CQI related to the D2D communication becomes less than the threshold value; a signal indicating that the CQI related to the D2D communication exceeds the threshold value; a signal indicating that a processing load of the UE 10 exceeds the threshold value, and a signal indicating that the processing load of the UE 10 becomes less than the threshold value.

Alternatively, in the case in which the radio base station 310 determines the change in the communication state of the user data, the D2D control signal indicates at least one of: a signal indicating the block error rate related to the D2D communication; a signal indicating the packet error rate related to the D2D communication; a signal indicating the CQI related to the D2D communication; and a signal indicating the processing load of the UE 10.

In the embodiment, an entity that switches the first assignment mode and the second assignment mode is mainly the UE 10 (the UE 10A or UE 10B). However, the embodiment is not limited thereto. For example, the entity that switches the first assignment mode and the second assignment mode may be the radio base station 310. In such a case, the radio base station 310 transmits a signal for requesting the switching of the first assignment mode and the second assignment mode to the UE 10 (the UE 10A or UE 10B).

Particularly not mentioned in the embodiment, it is possible to provide a program for causing a computer to execute each process performed by the UE 10 (the UE 10A or UE 10B). Furthermore, the program may be recorded on a computer-readable medium. By using the computer-readable medium, it is possible to install the program in a computer. Furthermore, the computer-readable medium recording the program thereon may include a non-transitory recording medium. The non-transitory recording medium is not particularly limited. For example, the non-transitory recording medium may include a recording medium such as CD-ROM or DVD-ROM.

Alternatively, it is also possible to provide a chip configured by a memory for storing a program for performing each process performed by the UE 10 (the UE 10A or UE 10B), and a processor for executing the program stored in the memory.

INDUSTRIAL APPLICABILITY

As described above, in the mobile communication system and the mobile communication method according to the present disclosure, the process for the radio terminal to discover another terminal could also be applied not only to the D2D communication but also to another process, and thus is available for a radio communication field.

The invention claimed is:

1. A radio terminal, comprising:
a receiver;
a controller; and
a transmitter, wherein
the receiver is configured to receive first information on radio resources for direct communication from a base station by broadcast,
the receiver is configured to receive second information on a threshold value from the base station,
the controller is configured to perform the direct communication by use of a radio resource autonomously selected among the radio resources,
the receiver is configured to directly receive a radio signal from another radio terminal during performing the direct communication by use of the radio resources,
the controller is configured to compare received power of the radio signal with the threshold value of the second information, and
the transmitter is configured to:
notify the base station of first information on the received power in response to the received power being larger than the threshold value; and
not notify the base station of the information on the received power in response to the received power being smaller than the threshold value.

2. A processor of a radio terminal, the processor communicatively coupled to a memory and configured to:
receive first information on radio resources for direct communication, from a base station by broadcast;
receive second information on a threshold value from the base station;
perform the direct communication by use of a radio resource autonomously selected among the radio resources;
directly receive a radio signal from another radio terminal during performing the direct communication by use of the radio resources;
compare received power of the radio signal with the threshold value of the second information;
notify the base station of information on the received power in response to the received power larger than the threshold value; and
not notify the base station of information on the received power in response to the received power being smaller than the threshold value.

3. A mobile communication method, comprising:
transmitting, by a base station, first information on radio resources for direct communication by broadcast;
receiving, by a radio terminal, the first information from the base station;
transmitting, by the base station, second information on a threshold value from the base station;
receiving, by the radio terminal, the second information from the base station;
performing, by the radio terminal, the direct communication by use of a radio resource autonomously selected among the radio resources;
directly receiving, by the radio terminal, a radio signal from another radio terminal during performing the direct communication by use of the radio resources;
comparing, by the radio terminal, received power of the radio signal with a threshold value of the second information;
notifying, by the radio terminal, the base station of information on the received power in response to the received power being larger than the threshold value; and
not notifying, by the radio terminal, the base station of the information on the received power in response to the received power being smaller than the threshold value.

* * * * *